(12) United States Patent
Royer et al.

(10) Patent No.: US 10,349,233 B2
(45) Date of Patent: Jul. 9, 2019

(54) INTERACTIVE COMMUNICATIONS SYSTEM

(71) Applicants: Jed P Royer, Miami, FL (US); Michael Moshe Pollak, New York, NY (US)

(72) Inventors: Jed P Royer, Miami, FL (US); Michael Moshe Pollak, New York, NY (US)

(73) Assignee: CHALLENGE STAR LLC, New York, NY (US)

( * ) Notice: Subject to any disclaimer, the term of this patent is extended or adjusted under 35 U.S.C. 154(b) by 100 days.

(21) Appl. No.: 15/179,256

(22) Filed: Jun. 10, 2016

(65) Prior Publication Data

US 2017/0265047 A1 Sep. 14, 2017

Related U.S. Application Data

(60) Provisional application No. 62/307,716, filed on Mar. 14, 2016.

(51) Int. Cl.
*H04L 12/58* (2006.01)
*H04W 4/12* (2009.01)
(Continued)

(52) U.S. Cl.
CPC .............. *H04W 4/12* (2013.01); *H04L 51/10* (2013.01); *H04L 51/32* (2013.01);
(Continued)

(58) Field of Classification Search
CPC .......... H04W 4/12; H04L 51/10; H04L 51/32; H04M 1/72552; H04M 1/72555; H04M 1/72563
(Continued)

(56) References Cited

U.S. PATENT DOCUMENTS 6,865,713 B1 3/2005 Bates
7,461,022 B1 12/2008 Churchill
(Continued)

OTHER PUBLICATIONS

J e n s e n, Olga, Use of New Mobile Media by Nonprofits and Development of Societal Mobile Apps, Sep. 2014, pp. 1-25, Media Design Univ. Publication, Berlin, Germany.
(Continued)

*Primary Examiner* — Kristie D Shingles
(74) *Attorney, Agent, or Firm* — The Law Firm of A.Q. Basit

(57) ABSTRACT

An electronic communications method includes receiving, by an electronic communications platform, a request to create an electronic communications event. The electronic communications platform is electronically operating within a client device. The electronic communications method also includes requesting, by the electronic communications platform, content associated with the electronic communications event. The electronic communications method also receiving, by the electronic communications platform, the content, wherein the content includes a photo, a title, text, and a time limit for interacting with the electronic communications event. The electronic communications method also includes electronically generating and posting, by the electronic communications platform, an electronic communications post associated with the electronic communications event, based on the received content; and sending, by the electronic communications platform, an electronic message to a computer-based application on another client device.

19 Claims, 26 Drawing Sheets

(51) Int. Cl.
  *G06F 15/16* (2006.01)
  *H04M 1/725* (2006.01)

(52) U.S. Cl.
  CPC ... *H04M 1/72547* (2013.01); *H04M 1/72552* (2013.01); *H04M 1/72555* (2013.01); *H04M 1/72563* (2013.01)

(58) Field of Classification Search
  USPC .......................................................... 709/206
  See application file for complete search history.

(56) References Cited

U.S. PATENT DOCUMENTS

| | | | |
|---|---|---|---|
| 8,229,819 | B2 | 7/2012 | Ransom |
| 8,234,193 | B2 | 7/2012 | Ransom |
| 8,473,421 | B2 | 6/2013 | Scalisi |
| 8,554,571 | B1 | 10/2013 | Harrison, Jr. |
| 8,725,653 | B1 | 5/2014 | Hernandez |
| 8,971,512 | B1 | 3/2015 | Cordell |
| 9,099,010 | B2 | 8/2015 | Ediger |
| 9,294,583 | B1 | 3/2016 | Sherrets |
| 9,641,807 | B2 * | 5/2017 | Schuder ................... H04N 7/18 |
| 9,767,461 | B2 * | 9/2017 | Clancy, Jr. ......... G06Q 30/0264 |
| 9,785,965 | B2 * | 10/2017 | Chetan ............... G06Q 30/0242 |
| 2008/0288277 | A1 | 11/2008 | Fasciano |
| 2008/0313011 | A1 * | 12/2008 | Rose ...................... G06Q 30/02 705/7.32 |
| 2009/0210291 | A1 | 8/2009 | Safar |
| 2010/0246789 | A1 * | 9/2010 | Vance .................... H04W 4/08 379/201.01 |
| 2010/0250672 | A1 * | 9/2010 | Vance .................. G06Q 10/109 709/204 |
| 2012/0122489 | A1 | 1/2012 | Frazier |
| 2012/0197815 | A1 | 8/2012 | Cameron |
| 2013/0275505 | A1 | 10/2013 | Gauglitz |
| 2013/0346498 | A1 | 12/2013 | Asver |
| 2014/0058969 | A1 | 2/2014 | Kane |
| 2014/0164275 | A1 | 6/2014 | Lee |
| 2015/0019523 | A1 | 1/2015 | Lior |
| 2015/0170226 | A1 | 6/2015 | Higgins |
| 2015/0262499 | A1 | 9/2015 | Wicka |
| 2016/0036759 | A1 * | 2/2016 | Prado ..................... H04L 51/16 709/206 |
| 2016/0246806 | A1 | 8/2016 | Bastide |
| 2016/0313957 | A1 | 10/2016 | Ebert |
| 2017/0003952 | A1 | 1/2017 | Nakahara |
| 2017/0076217 | A1 | 5/2017 | Krumm |
| 2017/0187662 | A1 * | 6/2017 | Royer ..................... H04L 51/24 |

OTHER PUBLICATIONS

Huang, Kaylee, Non-Final Office Action, dated Jul. 18, 2017, pp. 1-15, US Patent & Trademark Office.
Huang, Kaylee J, Final Office Action, U.S. Appl. No. 14/979,412, dated January 24, 2018, pp. 1-24, United States Patent and Trademark Office.
Huang, Kaylee, Notice of Allowance, dated Sep. 12, 2018, pp. 1-44, United States Patent & Trademark Office.

* cited by examiner

INTERACTIVE COMMUNICATIONS SYSTEM

CROSS-REFERENCE TO RELATED APPLICATION

This application claims the benefit of U.S. Provisional Application No. 62/307,716, filed Mar. 14, 2016.

BACKGROUND

Existing computer applications allow for the interaction and communications of multiple computing devices with each other. For example, one computing device (e.g., a smartphone) can use a computer application to send a text message to another computing device. Computing devices can also use computer applications to send audio messages, photos, and/or video messages.

DETAILED DESCRIPTION OF PREFERRED EMBODIMENTS

Figure 1:
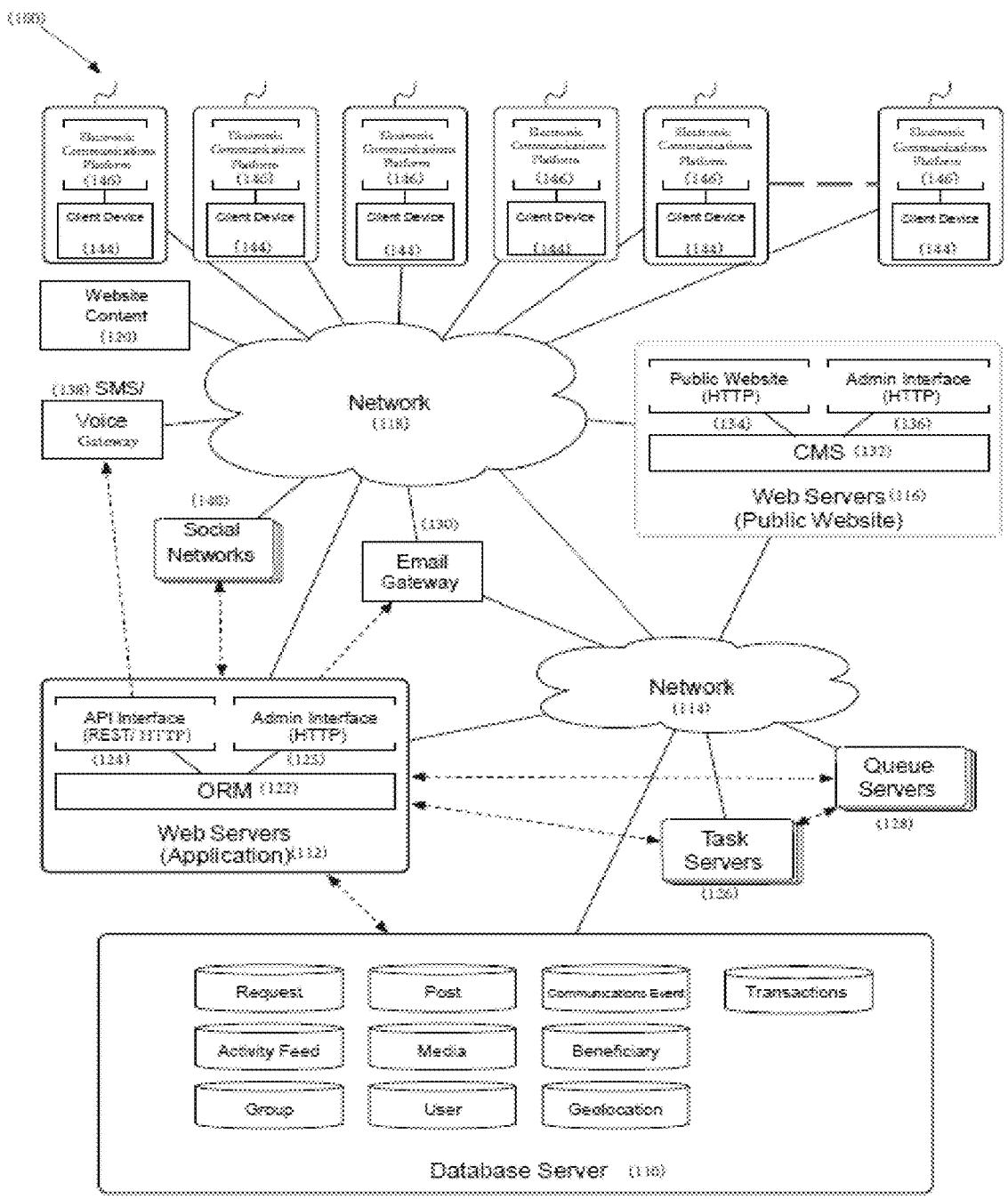
FIG. 1 is a diagram of an example environment in which systems and/or methods described herein may be implemented.

The following detailed description refers to the accompanying drawings. The same reference numbers in different drawings may identify the same or similar elements.

Systems, devices, and/or methods described herein may aggregate multiple electronic communications posts created by different users, using computing devices, and allow for other users, also using computing devices, to update and change existing electronic communications posts. In embodiments, the electronic communications posts are part of an electronic communications event which allows for electronic interaction between multiple computing devices. For example, a user, using a client device (e.g., a smartphone), may create an electronic communications event and/or an electronic communications post by using an electronic communications platform. In embodiments, the electronic communications platform, using electronic communications, interacts with other computing devices (e.g., servers, computers, etc.) to obtain photos, videos, text messages, audio messages, symbols, and/or any other type of content to be included in the electronic communications post. In embodiments, electronic communications post can be active within an electronic computing environment for a limited amount of time as determined by a user's electronic inputs.

In embodiments, the electronic communications post can then be aggregated, by the electronic communications platform, with other electronic communications posts onto a common electronic communications event. In embodiments, other users may then electronically interact with the electronic communications posts via the electronic communications platform that is displayable on their user device. The other users, using client devices, may update the electronic communications post by including a message in the electronic communications post, associating electronic tokens with the electronic communications post, and/or including additional information (e.g., an emoji, symbol, picture, text, etc.). In embodiments, the number of updates to a particular electronic communications post may be used to determine the electronic communications post's rank in comparison to other electronic communications posts.

Accordingly, the systems, devices, and/or methods described herein result in a technological improvement to existing communications systems that may (i) require fewer communications resources (e.g., pings, signals, content transfers, etc.) to aggregate types of content and multiple communications; (ii) automatically provide electronic updates without having to use additional computing resources to search for electronic content; (iii) provide real time and/or simultaneous interactions between different computing devices; (iv) provide an interactive electronic communications event that brings multiple users together and enhances user experience and increases the number of communications between the users based on an interest to electronically communicate with users who have something in common (e.g., friends, alumni, family, charitable goal, etc.) as well as a desire to compete; and (v) provide a single electronic communications event that can include multiple electronic communications posts that electronically transact with each other in multiple different ways to fulfill a need for competition and to also fulfill a need to interact with other users that have some kind of relationship with the user.

FIG. 1 is a diagram of example environment 100 in which systems, devices, and/or methods described herein may be implemented. FIG. 1 shows database server 110, web server 112, network 114, web server 116, network 118, website content 120, object relational mapping (ORM) 122, application programming interface (API) 124, administrative interface 125, task server 126, queue server 128, email gateway 130, content management system (CMS) 132, public website 134, administrative interface 136, short message service (SMS)/voice gateway 138, social network 140, client devices 144, and electronic communications platform 146.

Figure 2:
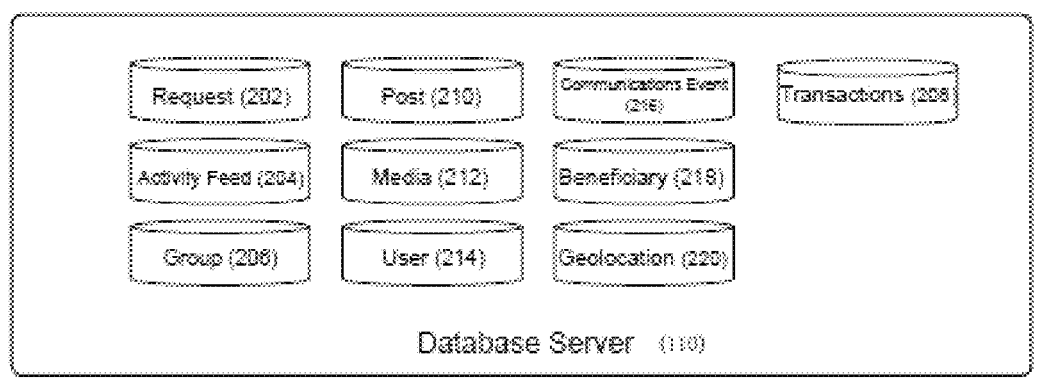
FIG. 2 is a diagram of an example computing device.

Database server 110 may include one or more network devices, or other types of computational or communications devices, that gather, process, search, store, and/or provide information in a manner described herein. Database server 110 may store identifier information for a user, of client device 144, and/or identifier information of client device 144. FIG. 2 of the detailed description further describes database server 110.

Web server 112 may include one or more computational or communications devices that gather, process, store, and/or provide information relating to one or more web pages associated with an electronic computing application that allows for API interface 124 and administrative interface 125 to interact with ORM 122 to utilize the information stored in database server 110.

Networks 114 and 118 may include a local area network (LAN), wide area network (WAN), a metropolitan network (MAN), a telephone network (e.g., the Public Switched Telephone Network (PSTN)), an ad hoc network, an intranet, the Internet, a satellite network, a GPS network, a fiber optic-based network, and/or combination of these or other types of networks. Additionally, or alternatively, networks 114 and 118 may include a cellular network, a public land mobile network (PLMN), a second generation (2G) network, a third generation (3G) network, a fourth generation (4G) network, a fifth generation (5G) network, and/or another network. In embodiments, networks 114 and/or 118 may allow for devices describe in FIGS. 1 and 2 to electronically communicate (e.g., using emails, electronic signals, URL links, web links, electronic bits, fiber optic signals, wireless signals, wired signals, etc.) with each other so as to edit and/or create electronic communications events and/or electronic communications posts.

Web server 116 may include one or more computational or communications devices that gather, process, store, and/or provide information relating to one or more web pages associated with public website 134 that is searchable and viewable over network 114 or network 118. Web server 112 may be used by a user, using administrative interface 136, to make changes to website 134 via CMS 132. In embodiments, web server 116 may access information and/or content from database server 110 and display information about a particular electronic communications event and/or electronic communications posts on public website 134.

Content server 120 may include one or more computational or communications devices that gather, process, store, and/or provide information relating to different organizations, such as charities, non-profit organizations, and/or individuals. In embodiments, electronic information from electronic communications platform 146 may be sent to content server 120. In embodiments, electronic information from content server 120 may be sent to electronic communications platform 146.

ORM 122 may include one or more computational or communications devices that gather, process, store, and/or provide information relating to different types of content and information associated with a user using client device 144. ORM 122 may map relationships between different databases and/or devices, such as those included in database server 110. In embodiments ORM 122 may receive and/or send information to other devices described in FIG. 1.

API interface 124 may include one more computational or communications devices that allow for interactions with other devices, such as SMS/voice gateway 138. API interface 124 may interact with other devices by using Hypertext Transfer Protocol (HTTP) protocol, representational state transfer (REST), and/or other protocols that allow for a particular level of computing performance, scalability, simplicity, and/or reliability.

Administrative interface 125 may include one or more computational or communications devices that allow for management of ORM 122 and database server 110. Administrative interface 125 may use the HTTP protocol, or any other protocol, to interact with ORM 122.

In embodiments, administrative interface 125 can be used to electronically manage content and/or information associated with electronic communications events and related information (e.g., locations, categories, etc.), profile information (e.g., beneficiary information, email verifications, group, persons, phone verification information, etc.), electronic user content (e.g., banners, links, media, photos, video, pledges, comments, posts, tags, etc.), administration activities (e.g., transactions, account management, transactions, transaction units, etc.), media management, documentation and API, geographical data (e.g., affirmative names, cities, countries, districts, postal codes, regions, sub-regions, etc.), authentications and verifications (e.g., stored usernames, password, third-party verification information, etc.), messages and activities (e.g., actions, follows, messages, pending messages, challenge invitations, follow requests, group follow requests, group invitations, etc.), and recent activities.

Task server 126 may include one or more computational or communications devices that allow for registering different tasks that will be managed for queuing by queue server 128.

Queue server 128 may include one or more computational or communications devices that allow for the management of electronic communications posts that are generated by client device 144 using electronic communications platform 146. Queue server 128 may interact with other devices, such as task server 126, shown in FIG. 1 via network 114 and/or network 118.

Email gateway 130 may include one or more computational or communications devices that allow for electronic mail (email) to be sent from web server 112 to other devices (e.g., web server 116, client device 144, etc.) via networks 114 and 118. For example, an email notification about a particular electronic communications event may be sent to client device 144. In embodiments, information and/or content may be sent by a user, using electronic communications platform 146, via email gateway 130 to database server 110.

CMS 132 may include one or more computational or communications devices that allow for the management of content on public website 134. CMS 132 may be accessed by administrative interface 136, using a HTTP protocol, to change content displayed by public website 134.

Public website 134 may include one more types of content that are displayed on one or more web pages that can be accessed via network 114 and/or 118. Public website 134 may be accessed by using a HTTP protocol, or any other computer-based protocol, and may be edited via administrative interface 136. In embodiments, activities, content and/or information occurring within a particular electronic communications event may simultaneously and/or in real-time be shown for display on public website 134 and create an interest for prospective new users of electronic communications event 146. Accordingly, users in different geographic locations can experience an electronic communications event at the same time and/or in real-time.

Administrative interface 136 may include one or more computational or communications devices that allow for access to CMS 132 to edit and manage public website 134. Administrative interface 136 may use a HTTP protocol, or any other protocol, to communicate with CMS 132.

SMS/voice gateway 138 may include one or more computational or communications devices that allow for storing and sending SMS messages, voice communications, and other electronic communications (e.g., values of electronic token transactions) between web server 112 and client device 144. SMS/voice gateway 138 may receive requests from web server 112 which are then sent to client device 144 as a SMS message or as a voice communications. For example, SMS/voice gateway 138 may send an SMS message to client device 144 regarding a notification of any update to an electronic communications event. In embodiments, information and/or content may be sent by a user, using electronic communications platform 146, via SMS/voice gateway 138 to database server 110.

Social network server 140 may include one or more computational or communications devices that allow for storing content and information about one or more users of client device 144. Social network server 140 may include a user's name, location, ethnicity, preferences (e.g., movies, television shows, books, political preferences, account login information, credentials, etc.). Social network server 140 may send, with permission of a user, information and content to web server 112. Social network server 140 may also send information and content to electronic communications platform 146 stored by client device 144 for usage in determining notifications, recommendations, and/or other actions. In embodiments, social network server 140 may receive electronic information from electronic communications platform 146 and display the electronic information on a webpage associated with social network server 140.

Client devices 144 (referred to collectively as "client devices 144" and individually as "client device 144") may include any computation or communications device that is capable of communicating with a network (e.g., network 118). For example, client device 144 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a desktop computer, a laptop computer, a tablet computer, a camera, a personal gaming system, a television, a set top box, a digital video recorder (DVR), or another type of computation or communications device.

Client devices 144 may receive and/or display content. The content may include objects, data, images, audio, video, text, files, and/or links to files accessible via one or more networks. Content may include a media stream, which may refer to a stream of content that includes video content (e.g., a video stream), audio content (e.g., an audio stream), and/or textual content (e.g., a textual stream). In embodiments, electronic communications platform 146 may use an electronic graphical user interface to display content and/or information via client device 144. Client device 144 may have a touch screen and/or a keyboard that allows a user to electronically interact with electronic communications platform 144. In embodiments, a user may swipe, press, or touch client device 144 in such a manner that one or more electronic actions will be initiated by client device 144 and/or electronic communications platform 146.

Client device 144 may include a variety of applications, such as, for example, an e-mail application, a telephone application, a camera application, a video application, a multi-media application, a music player application, a visual voice mail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.). Various features of some of the above applications may be part of electronic communications platform 146.

Electronic communications platform 146 may include one or more computer-based applications that are capable of creating an electronic communications event. In embodiments, the electronic communications event may be created by a user so that it associated with a particular purpose, such as providing information about a particular charity that is seeking to raise funds. Electronic communications platform 146 may also aggregate multiple electronic communications post, associated with the electronic communications event, and display the aggregated electronic communications posts on a client device 144. In embodiments, the electronic communications event can be displayed within the same computer-based application on different devices or can be displayed on different computer-based applications on different devices. Electronic communications platform 146 may allow for a user, using client device 144, to create an electronic communications post that includes video, photos, audio, and/or textual content. Electronic communications platform 146 may allow for a user that did not create an electronic communications post to edit/change that particular electronic communications post. Electronic communications platform 146 may automatically receive updated content and information based on electronic analysis and processing of information by database server 110.

In embodiments, electronic communications platform 146 may interact with portions of client device 144 and retrieve content automatically from client device 144 without client device 144 having to store the content in its device memory storage system. For example, a user may want to add a photo to an electronic communications post. As such, electronic communications platform 146 may provide the user with an option to take a photo using client device 144's camera such that the photo is electronically transferred from client device 144's camera directly to electronic communications platform 146 without having to store the photo in client device 144's photo library. In embodiments, electronic communications platform 146 may be stored entirely by client device 144 or may have different features and/or capabilities stored on multiple devices as described in FIG. 1.

FIG. 2 is a diagram of example computing device, such as database server 110. FIG. 2 shows database server 110, request 202, activity feed 204, group 206, transactions 208, post 210, media 212, user 214, communications event 216, beneficiary 218, and geolocation 220. In embodiments, request 202, activity feed 204, group 206, transactions 208, post 210, media 212, user content 214, communications event 216, beneficiary 218, and geolocation 220 may be computational devices that are part of database server 110 or may be database structures stored by database server 110. While FIG. 2 show request 202, activity feed 204, group 206, transactions 208, post 210, media 212, user 214, communications event 216, beneficiary 218, and geolocation 220 as being part of one computing device, each of these elements may grouped in any fashion on other computing devices. In embodiments, the information and/or content stored in any of these elements of database server 110 may be received or sent to graphical electronic pages as described in FIGS. 11-17.

Request 202 may store content and/or information relating to requests made by users using electronic communications platform 146 on client device 144. In embodiments, request 202 may include requests made by one user to modify an activity, such as an electronic communications event between different users, a request by a user to join an electronic communications event, a request to withdraw from an electronic communications event, a request to follow another user, a request to follow a group, a request to view a particular electronic communications event, an invite to a particular electronic communications event, an invite to a particular group, and/or any other request made by a user using electronic communications platform 146. In embodiments, electronic communications platform 146 may send user requests to request 202 via network 118 and web server 112. In embodiments, request 202 may be used by database server 110 and/or ORM 122 to generate electronic notifications that are then sent to electronic communications platform 146.

Activity feed 204 may include content and/or information that are displayed on a newsfeed via electronic communications platform 146. In embodiments, activity feed 204 may include information relating to electronic communications events created by a user, electronic communications events participated by a user, and the electronic communications of users that are being followed by a particular user. In embodiments, activity feed 204 may be used to generate content and/or information for the newsfeed based on previous electronic communications. For example, activity feed 204 may interact with geolocation 220 to provide content and/or information about electronic communications posts or electronic communications events based on the location of a user of client device 144. For example, a user located in Florida may be provided content and/or information about an electronic communications event and/or an electronic communications post that is occurring in Florida. In embodiments, the newsfeed may automatically provide a newsfeed based on previous electronic communications or a user of electronic communications platform 146 may input preferences for a newsfeed which are then stored by activity feed 204.

Group 206 may include content and/or information about different groups that are created by users via electronic communications platform 146. In embodiments, group 206 may automatically obtain group information from electronic communications platform 146, stored by client device 144, via network 118 and web server 112. In embodiments, group 206 may store information about groups that are based on familial relationships, friendships, geographical location, college or high school alumni relationships, employment relationships, etc. In embodiments, group 206 may include for each user of a group, the user's name, profile picture, the group moderator, location, the group name, any hashtag, category type (e.g., family, friends, high school alumni, etc.), and/or any other information.

Transactions 208 may include about different types of transactions of value that are associated with an electronic communications event created by a user using electronic communications platform 146. In embodiments, transactions 208 may store, retrieve, and/or calculate values that are associated with a particular electronic communications event. In embodiments, the calculated values may be associated with electronic tokens or other electronic transactions that can be used to purchase goods and/or services in the electronic computing environment or in the non-electronic computing environment. In embodiments, transactions 208 may store information about electronic accounts that are retrieved from other computing devices. In embodiments, transactions 208 may calculate whether an electronic account has a threshold value that allows for a user to transfer value from that electronic account to allow for participation in an electronic communications event.

In embodiments, transactions 208 determine when a user requests withdrawing value from an electronic communications event and transfer value, via electronic communications, back to an electronic account. In embodiments, the value may be associated with electronic tokens or any electronic transaction that can be used to purchase goods and/or services. In embodiments, transaction 208 may be used to determine whether a user has obtained a particular number of electronic tokens at the end of an electronic communications event. If so, electronic communications platform 146 may receive an electronic communications from database server 110 that will provide an electronic message (e.g., SMS, email, text, etc.) to the user. The text message may indicate to the user whether the user is interested in providing a portion of the gained number of electronic tokens to another user or organization, such as a charity.

Post 210 may include content and/or information associated with one or more electronic communications posts that are part of one or more electronic communications events. In embodiments, post 210 may include information about a user that posted the electronic communications post, the electronic communications event associated with the electronic communications post, any captions and text associated with an electronic communications post, types of media (e.g., video, photos, etc.) associated with the electronic communications post, a quantity of votes associated with the electronic communications post, and any transactions relating to the electronic communications post.

Media 212 may include information regarding different types of media that are included in an electronic communications event and/or electronic communications post. In embodiments, media 212 may store different photos, videos, audio, text, and/or any other multimedia information that is used as part of an electronic communications event and/or an electronic communications post.

User content 214 may include information regarding one or more users of electronic communications platform 146. In embodiments, user content 214 may include information regarding a user's legal name, a user's name as used within electronic communications platform 146, email address, phone number, photo, banner, interests (e.g., interested in cancer charities), geographic location, other users following that user, and other users being followed by that user. In embodiments, user content 214 may be used by database server 110 and/or web server 112, in conjunction with ORM 122, task server 126, and/or queue server 128 to automatically determine electronic content and/or information, electronic communications events, and/or electronic communications posts, that are electronically sent, via networks 114 and/or 118, for display on an electronic graphical-based electronic display (e.g., a wall) within electronic communications platform 146. Accordingly, a user, using electronic communications platform 146, does not need to send multiple electronic communications to database server 110 or web server 112 to obtain electronic information about a particular electronic communications event or a particular electronic communications post. Thus, the number of communications is reduced between client device 144 and other devices, which results in reduced processor and memory usage by the computing resources of client device 144. Furthermore, database server 110 also requires using less processor and memory usage as it does not need to receive and/or store multiple requests for a particular electronic communications event.

Communications event 216 may include information regarding one or more electronic communications events. In embodiments, each stored electronic communications event may include information about the time period of the communications event, any threshold entry requirements for participating in the electronic communications event, any electronic communications posts associated with the electronic communications event, any actions taken by any users relating to any of the electronic communications posts associated with the electronic communications event. In embodiments, information relating to a stored electronic communications event may be used by database server 110, web server 112, and/or ORM 122 to send information about the stored electronic communications event to an electronic communications platform 146 based on information stored in request 202, activity feed 204, group 206, post 208, media 210, user content 2012, and/or geolocation 220.

Beneficiary 218 may include information about a particular entity that may receive tokens, rewards, electronic tokens, or anything considered of value based on the interactions of multiple users that are electronically communicating with each other via one or more electronic communications posts on electronic communications platform 146. In embodiments, the aggregation of multiple values from different electronic communications posts can be sent to one or more beneficiaries as identified by a user. In embodiments, the creation of an electronic communications event may include information about a beneficiary. In embodiments, the information about the beneficiary may include a beneficiary name, address, email, hashtag, identifier indicating the beneficiary as a charity or non-profit, and verification of the beneficiary as a charity or non-profit. In embodiments, beneficiary 218 may communicate with web site server 120 to retrieve information that validates the status of the beneficiary as a charity or non-profit. In embodiments, beneficiary 218 may store electronic information about past verified beneficiaries without having to communicate with other computing devices to perform verification. Accordingly, by storing past verified beneficiary information, database server 110 or beneficiary 218 may not need to use additional computing memory or processing resources to send communications pings, signals, or links to other networked computing devices.

Geolocation 220 may store information about a location of a registered user of electronic communications platform 146. In embodiments, geolocation 220 may include information about the user's street address, city or town, state, postal code, and/or country. In embodiments, geolocation 220 may also store information about the location of an electronic communications event. In embodiments, geolocation 220 may be used to determine, generate, and electronically send electronic notifications to electronic communications platform 146. For example, geolocations 220 may send electronic notifications to client device 144 that is within a particular geographical radius, zip code, city, region, state, or country based on the location of the electronic communications event.

Accordingly, request 202, activity feed 204, group 206, transactions 208, post 210, media 212, user 214, communications event 216, beneficiary 218, and geolocation 220 may be used individually or in conjunction with each other to (i) generate recommendations to a user of electronic communications platform 146 that reduces computing and electronic communications resources that would be spent on searching for the same or similar recommendations; (ii) automatically send an electronic communications event to electronic communications platform 146 based on a user's past electronic communications and/or transactions with electronic communications platform 146; (iii) store electronic information on different users and beneficiaries so that database server 110, web server 112, and/or ORM 122 reduce the number of electronic communications sent to other devices; (iv) store multiple electronic communications posts that can be used to create recommendations to users who create an electronic communications post and to users who participate in the electronic communications post by sharing, adding content, providing a vote, and/or adding electronic tokens or something else of value; and (v) store electronic account information so that users can provide electronic tokens or something of else of value to show that they have electronically communicated with an electronic communications post.

Figure 3:
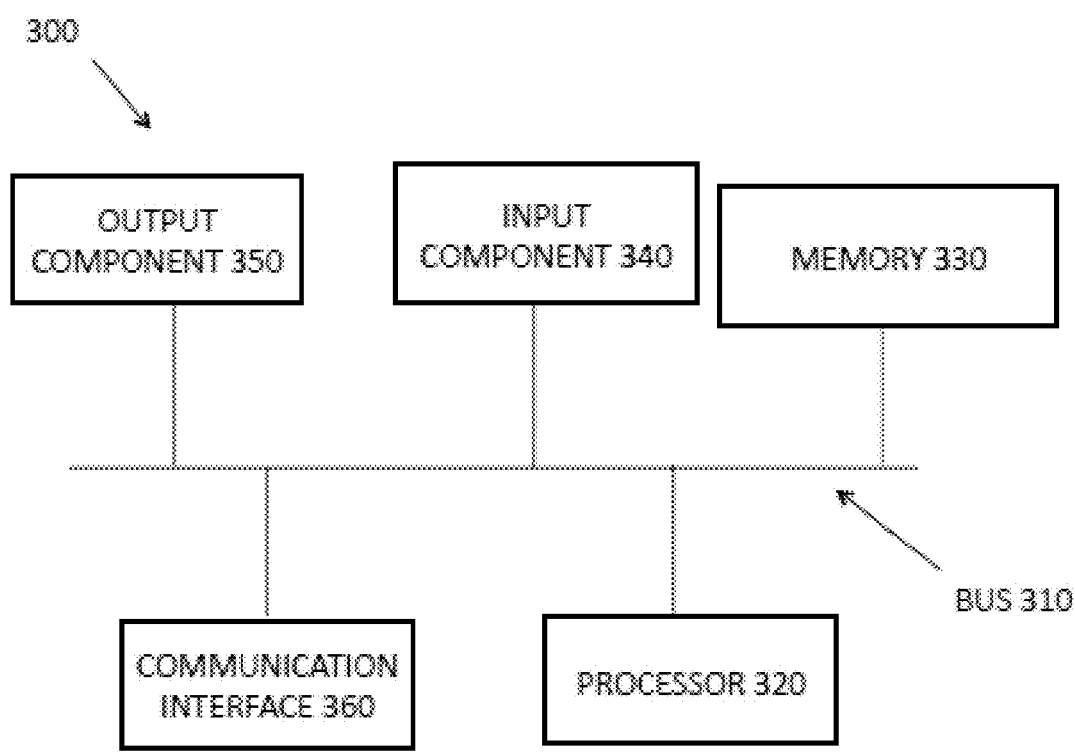
FIG. 3 is a diagram of example components of one or more devices in FIG. 1 and FIG. 2.

FIG. 3 is a diagram of example components of a device 300. Device 300 may correspond to database server 110, web server 112, web server 116, web server 120, ORM 122, task server 126, queue server 128, email gateway 130, CMS 132, SMS/voice gateway 138, social network 140, request 202, activity feed 204, group 206, transactions 208, post 210, media 212, user 214, communications event 216, beneficiary 218, and/or geolocation 220. Alternatively, or additionally, database server 110, web server 112, web server 116, web server 120, ORM 122, task server 126, queue server 128, email gateway 130, CMS 132, SMS/voice gateway 138, social network 140, request 202, activity feed 204, group 206, transactions 208, post 210, media 212, user 214, communications event 216, beneficiary 218, and/or geolocation 220 may include one or more devices 300 and/or one or more components of device 300.

As shown in FIG. 3, device 300 may include a bus 310, a processor 320, a memory 330, an input component 340, an output component 350, and a communications interface 360. In other implementations, device 300 may contain fewer components, additional components, different components, or differently arranged components than depicted in FIG. 3. Additionally, or alternatively, one or more components of device 300 may perform one or more tasks described as being performed by one or more other components of device 300.

Bus 310 may include a path that permits communications among the components of device 300. Processor 320 may include one or more processors, microprocessors, or processing logic (e.g., a field programmable gate array (FPGA) or an application specific integrated circuit (ASIC)) that interprets and executes instructions. Memory 330 may include any type of dynamic storage device that stores information and instructions, for execution by processor 320, and/or any type of non-volatile storage device that stores information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communications interface 360 may include any transceiver-like mechanism that enables device 300 to communicate with other devices and/or systems. For example, communications interface 360 may include an Ethernet interface, an optical interface, a coaxial interface, a wireless interface, or the like.

In another implementation, communications interface 360 may include, for example, a transmitter that may convert baseband signals from processor 320 to radio frequency (RF) signals and/or a receiver that may convert RF signals to baseband signals. Alternatively, communications interface 360 may include a transceiver to perform functions of both a transmitter and a receiver of wireless communications (e.g., radio frequency, infrared, visual optics, etc.), wired communications (e.g., conductive wire, twisted pair cable, coaxial cable, transmission line, fiber optic cable, waveguide, etc.), or a combination of wireless and wired communications.

Communications interface 360 may connect to an antenna assembly (not shown in FIG. 3) for transmission and/or reception of the RF signals. The antenna assembly may include one or more antennas to transmit and/or receive RF signals over the air. The antenna assembly may, for example, receive RF signals from communications interface 360 and transmit the RF signals over the air, and receive RF signals over the air and provide the RF signals to communications interface 360. In one implementation, for example, communications interface 360 may communicate with network 114 or 118 and/or devices connected to network 114 or 118.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
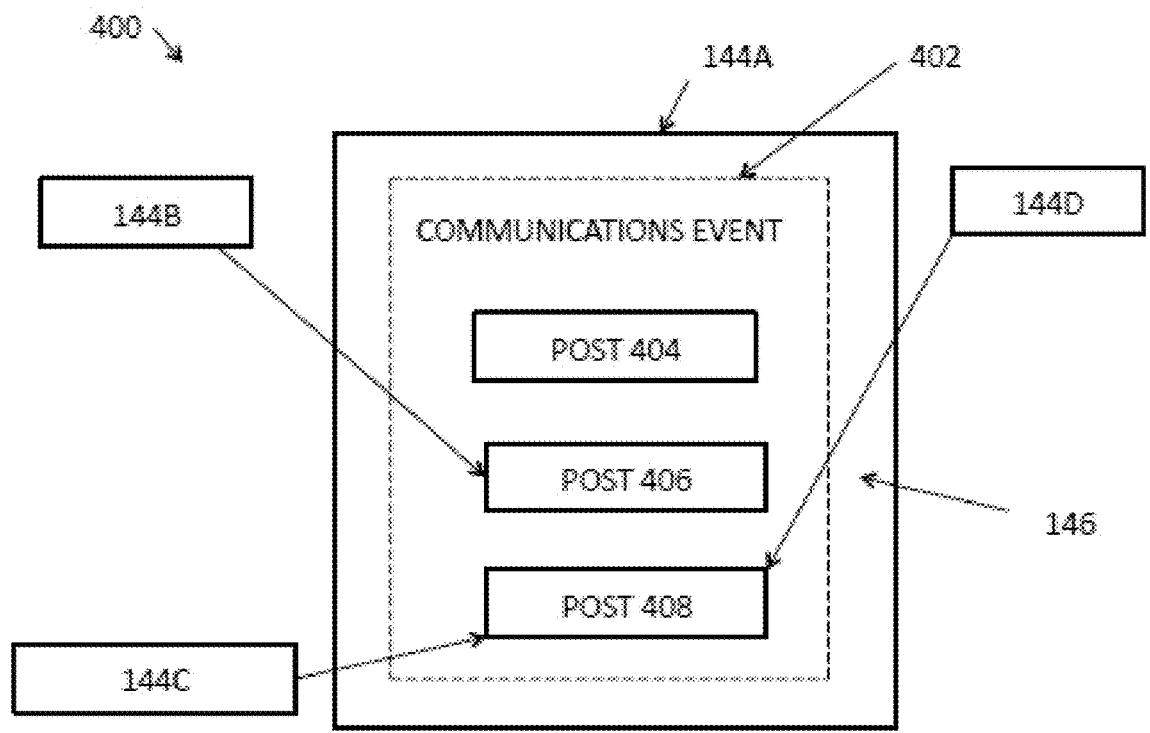
FIG. 4 is a diagram of an example process for aggregating and updating one or more electronic communications posts.

FIG. 4 is a diagram of an example process for aggregating and updating one or more electronic communications posts associated with an electronic communications event. FIG. 4 shows client device 144A, 144B, 144C, and 144D. In embodiments, client device 144A, 144B, 144C, and 144D are the same or similar to client device 144, as described in FIG. 1. As shown in FIG. 4, client device 144A is displaying an electronic communications event 402 via electronic communications platform 146. In embodiments, electronic communications event 402 may have been created by, for example, Tom for the purpose of communicating information about a particular beneficiary (e.g., United Way) that helps children in low-income areas of urban centers. Thus, electronic communications event 402 may be created as a challenge, game, or competition, within an electronic computing environment, to raise awareness and electronic tokens for a charity. In embodiments, Tom may first see a profile page with various actions that is similar to screen shot 1100 as described in FIG. 11. In embodiments, Tom may have decided that electronic communications event 402 is to be available for interaction for other users of electronic communications platform 146 for three weeks. In embodiments, Tom may create electronic communications event 402 using an electronic page similar to screen shot 1200 as described in FIG. 12. Tom also decides to post a video along with other information in post 404 and Tom hopes that other users will compete, participate, etc., him during this electronic communications event. In embodiments, at a later time, Jane may be using client device 144B and electronic communications platform 146. In the past, Jane has participated in an electronic communications event that focused on poverty in urban areas. Using Jane's past activities, database server 110, in conjunction with ORM 122 and/or web server 112, (e.g., using information in one or more parts of database server 110 as described in FIG. 2) sends an automatic notification to client device 144B. In embodiments, the automatic notification is displayed to Jane via electronic communications platform 146 stored on client device 144B and is similar to screen shot 1600 in FIG. 16. In embodiments, Jane may see the notification on an electronic graphical display similar to screen shot 1600 in FIG. 16. Based on the notification of electronic communications event 402, created by Tom, Jane decides to participate in electronic communications event 402 similar to screen shot 1500 in FIG. 15. Accordingly, Jane creates post 406, which includes a photo, and sends an electronic communications of post 406 to client device 144A. Jane likes to compete with other individuals. As such, electronic communications event 402 results in a desire for competition being translated into increased electronic communications performed voluntarily by the user and a reduction in other types of electronic transactions and/or computer processing usage. Janes is given the option of taking a photo using client device 144B's camera with the photo being electronically transferred to post 406 without having to store the photo in client device 144B's memory. Post 406, for example, also includes a request for votes, comments, and/or electronic tokens from other users. In addition, Mike is also notified of Tom's electronic communications event because Mike is located in the same city as Tom. While Mike has not shown a past interest in urban issues, Mike receives automatic electronic notifications on client device 144C based on his shared geographic location with Tom. Mike also decides to create post 408, including a video, which is then electronically sent to client device 144A. In embodiments, Tom may have required a buy-in amount, such as a certain number of tokens to allow participation in electronic communications event 402. In embodiments, Mike may be required to buy-in to be able to participate in the electronic communications event 402 in a manner similarly described in process 700 in FIG. 7. At a later time, Mary opens electronic communications platform 146 on client device 144D. Mary decides to go to her electronic communications wall that provides a newsfeed of current electronic communications events, such as example screen shot 1700 described in FIG. 17. Mary is part of a high school alumni group that includes Tom and is notified whenever a member of the group has created an electronic communications event. In embodiments, Mary can also search for electronic communications events based on members of her group and/or other searching parameters in a manner similar to that described in FIG. 14.

Thus, Mary decides to participate in Tom's electronic communications event. Mary decides to select post 408 as she likes Mike's video that he included in post 408. After she selects post 408, Mary may like post 408 by voting or liking post 408 and/or Mary can like the post by providing electronic tokens of value to show her support for post 408. In embodiments, the electronic tokens can be associated with a pledge amount, as described in FIG. 8, or associated with a sweeten amount, as described in FIG. 9. The electronic tokens of value are transferred from an electronic account to an electronic account associated with electronic communications event 402. Mary can also edit Mike's post 408 by providing a text message that is incorporated into post 406. Mary can also interact with post 408 by pressing down on the display area of post 408 (e.g., the photo/video within the electronic communications post) and be prompted to like and/or pledge tokens to the post by electronically responding with a photo or video of her own. At the conclusion of electronic communications event 402, which expires after three weeks, the collected tokens from posts 404, 406, and 408 are electronically sent to Tom's charity. Tom may also decide that the electronic communications post that had the greatest number of transactions also receive something of benefit. In embodiments, the distribution of tokens may be based on process 1000, as described in FIG. 10.

Accordingly, example 400 describes electronic interactions that occur within a computing environment whereby simultaneous electronic communications posts can be aggregated together without multiple users having to create an individual electronic post for one charity and having to generate additional computer processing and electronic communications resources to provide electronic tokens and/or things of value via another computing application. Thus, the aggregation of content, voting, electronic tokens into a single electronic communications event may reduce computing processing and a potential number of particular communication signals. Furthermore, the aggregation of electronic communications posts allows for an electronic analysis of the number of transactions for each electronic communications posts (e.g., Tom has four electronic transactions, Mike has eight electronic transactions, Mary has one electronic transaction) and used to determine a rank and/or a successful user. While FIG. 4 describes example 400 in the context of a charity, example 400 could have been described as an electronic communications event that is a game or challenge between different users, and the electronic tokens are given to the user who gets the most votes or likes for a particular post (e.g., Tom wins with post 408 getting the most likes, tokens, etc.). Accordingly, the electronic communications event increases electronic communications between users based on an interest by the users to compete with each other by getting the greatest number of votes, likes, electronic tokens, etc. Also, while FIG. 4 describes notifications and interactions between electronic communications platforms 146, the same interactions described in FIG. 4 can be between electronic communications platforms 146 and electronic websites so that a notification (such as one sent to Jane) is sent to a website and allows a user to interact with a communications event or post via a website and/or any other computer-based applications.

Figure 5:
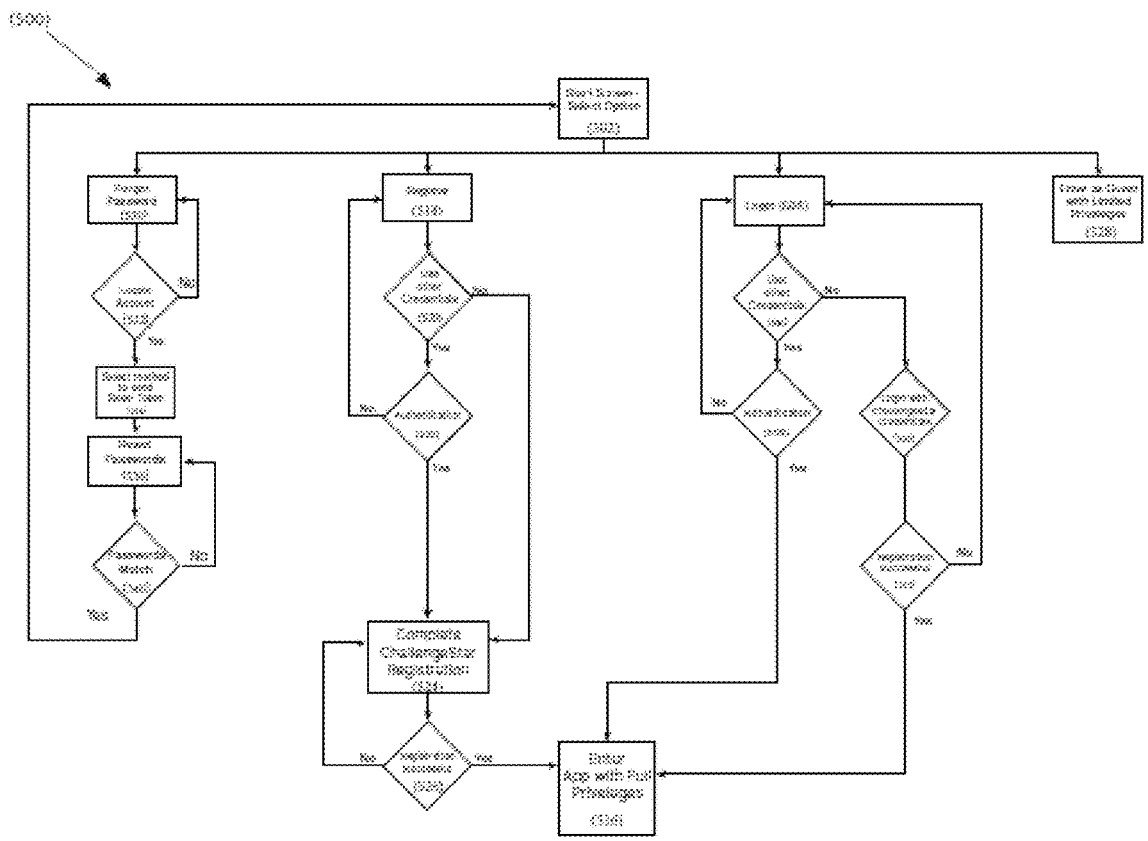
FIG. 5 is a flow chart of an example process for authenticating a user.

FIG. 5 is a flow chart of an example process 500 for authenticating a user of electronic communications platform 146. In embodiments, the authentication process may display screen shot 1100 as described in FIG. 11. At step 502, a start screen is displayed to a user of client device 144 via electronic communications platform 146. In embodiments, the user has four options. These four options include forgot password, register, login, and enter as guest with limited privileges.

If the user is already registered with electronic communications platform 146, the user, at step 504, may log into electronic communications platform 146. In embodiments, the user has the option to use information associated with another electronic computer application. If the user provides credentials associated with another electronic computer application (step 506—YES), then electronic communications platform 146 may perform a verification of the information. In embodiments, the verification may be based on communicating with database server 110, social network 140, and/or another device. If the authentication is successful (step 508—YES), then the user may be provided access as a registered user to electronic communications platform 146 at step 516. If the authentication is not successful (step 508—NO), then the user will be prompted back to the login display screen at step 504.

If the user does not use an external authentication (step 506—NO), then, at step 510, the user will be prompted by electronic communications platform 146 to login by using the applicant's credentials stored by electronic communications platform 146. In embodiments, the login information may include a password, biometric information, a user name, and/or any other type of identifier associated with the user. If the registration is successful (step 512—YES), then, at step 516, the registration will result in the user having access to electronic communications platform 146. If the registration is not successful (step 512—NO), then the user will be sent back to the login display screen at step 504.

In embodiments, the user may also select an option of entering electronic communications platform 146 as a guest. If the user enters electronic communications platform 146 as a guest (step 528), then the user may have limited capabilities within electronic communications platform 146. For example, as a guest, the user may not be able to create any electronic communications posts.

Alternatively, the user may not be registered with electronic communications platform 146. Accordingly, at step 518, the user may select to register with electronic communications platform 146. At step 520, the user may be given the option of using login credentials associated with another computer application. If the user decides to use login credentials associated with another computer application (step 520—YES), then, at step 522, electronic communications platform 146 may authenticate these login credentials. If the authentication is successful (step 522—YES), then, at step 524, the user can complete the remaining registration process. If the registration process is complete (step 526—YES), then, at step 516, the user can enter electronic communications platform 146 with full privileges. If the registration is not successful (step 526—NO), then the user may be returned to complete the registration, at step 524.

If the user does not use external credentials (step 520—NO), then the user may complete registration by using electronic communications platform 146's own registration process at step 524. If the registration is successful (step 526—YES), then the user may enter electronic communications platform 146 with full privileges at step 516. If the registration is not successful (step 526—NO), then the user may be prompted by the user to complete registration correctly, at step 524.

If the user has forgotten their password to enter electronic communications platform 146, then, at step 530, the user may indicate to electronic communications platform 146 that the user has forgotten his/her password. In embodiments, electronic communications platform 146 may attempt to locate the user's registration account with electronic communications platform 146. If the user's account cannot be located (step 532—NO), then user may be brought back to the forgot password selection at step 530. If the user's account is located (step 532—YES), then, at step 534, the user may be prompted to select a process to receive a reset token. In embodiments, the user may decide that the reset token be sent via SMS message, voice, or a text message to another electronic account. Once the user receives the reset token, the user, at step 536, may reset their password and select a new password. In embodiments, this may include an authentication process that matches passwords. If the passwords match (step 540—YES), then the electronic communications platform 146 will display the start screen at step 502. Accordingly, the user may, at step 504, then log into electronic communications platform 146. If the passwords do not match (step 540—NO), then electronic communications platform 146 may return the user back to the reset password at step 536.

Figure 6:
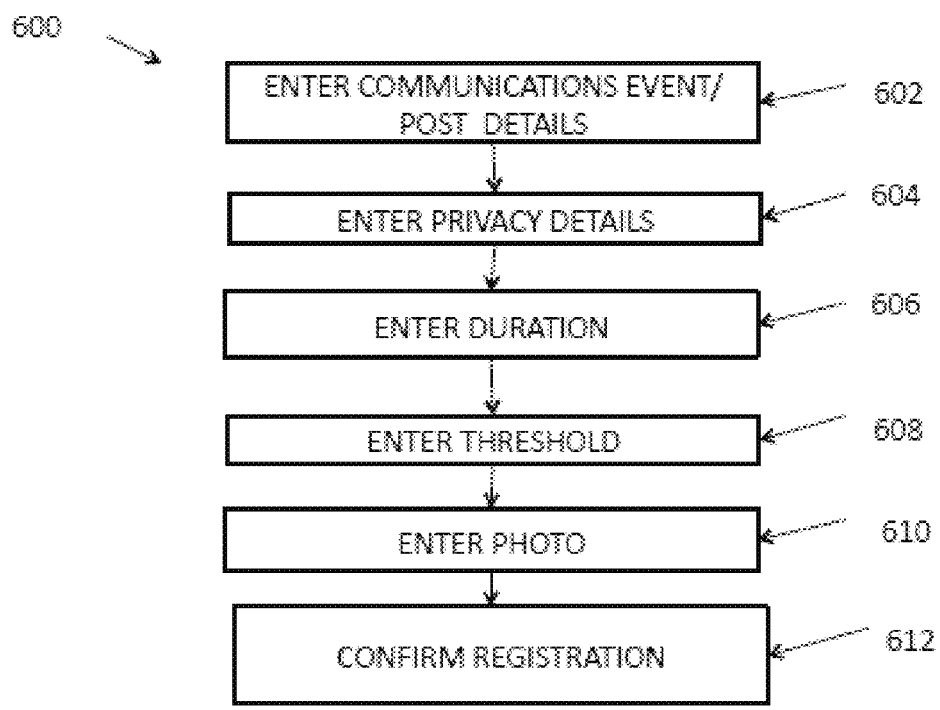
FIG. 6 is a flow chart of an example process for creating an electronic communications event or post.

FIG. 6 is a flow chart of an example process 600 for creating an electronic communications event and/or post. In embodiments, process 600 may be performed by electronic communications platform 146. In embodiments, the electronic communications event and/or electronic communications post can be associated with the screen shots described in FIGS. 11-17. In embodiments, example process 600 may be used to create an electronic communications event, such as Tom's electronic communication event 402 described in FIG. 4.

At step 602, electronic communications platform 146 may receive details about a particular electronic communications events. In embodiments, the details may include information about the beneficiary of the electronic communications events and/or electronic communications post, the user's email, a category associated with the electronic communications post, a name for an electronic communications event.

At step 604, the user may enter privacy details. In embodiments, the user may determine whether the electronic communications event (e.g., a challenge) can only include other users who are invited by the user, whether the challenge is private and cannot be displayed to all users, or whether the challenge is public and anyone can participate. If the electronic communications event is private, then there may be a reduction of communications signals sent from client device 144 as not every client device 144 that has electronic communications platform 146 will be electronically notified.

At step 606, the user, using electronic communications platform 146, may determine the duration of the electronic communications event and any associated electronic communications posts. For example, the user may limit the challenge for two days. During the two days, the user's electronic communications post will be available to other users, depending on privacy settings, for other users to comment on that post or create their own electronic communications posts to challenge the user's electronic communications post. In embodiments, the electronic communications event will expire at the end of the duration and be removed so that other users cannot access the electronic communications event. In embodiments, rather than start the electronic communications event immediately upon its creation, a user may provide electronic instructions to start the electronic communications event at a later time (e.g., a delayed start). For example, if the user creates the electronic communications event on November 10, the user may decide that participation and activities associated with the electronic communications event will start on December 1. Thus, electronic communications platform 146 may store the electronic communications event and prevent any notification or participation in the electronic communications event until the pre-programmed start date. In embodiments, electronic code may include electronic instructions that are sent from electronic communications platform 146, stored by client device 144, to ORM 122 and/or database server 110 to prevent any electronic communications from occurring that would allow for interactions with the electronic communications event until the pre-determined start time/date.

At step 608, the user may determine whether there is a threshold value (e.g. buy-in amount) to enter the electronic communications event. For example, the user may determine that two tokens are required to enter the challenge. Thus, the user would provide two electronic tokens from their account and be able to enter the challenge. In embodiments, an electronic token may be one or more electronic bits that are electronically transferable from one computing device to another device and whereby the transfer increases or decrease a value and/or the memory storage of a computing device, such as client device 144.

At step 610, the user may add a photo or video associated with the electronic communications event. In embodiments, the photo or video may be created using client device 144 or may be electronically sent, via a request by electronic communications platform 146, from another device.

At step 612, the electronic communications platform 146 may confirm the user's registration. If the user is registered, then the electronic communications event is posted. If the user is not registered, then the user will be prompted to register prior to the posting of the electronic communications post and challenge.

Figure 7:
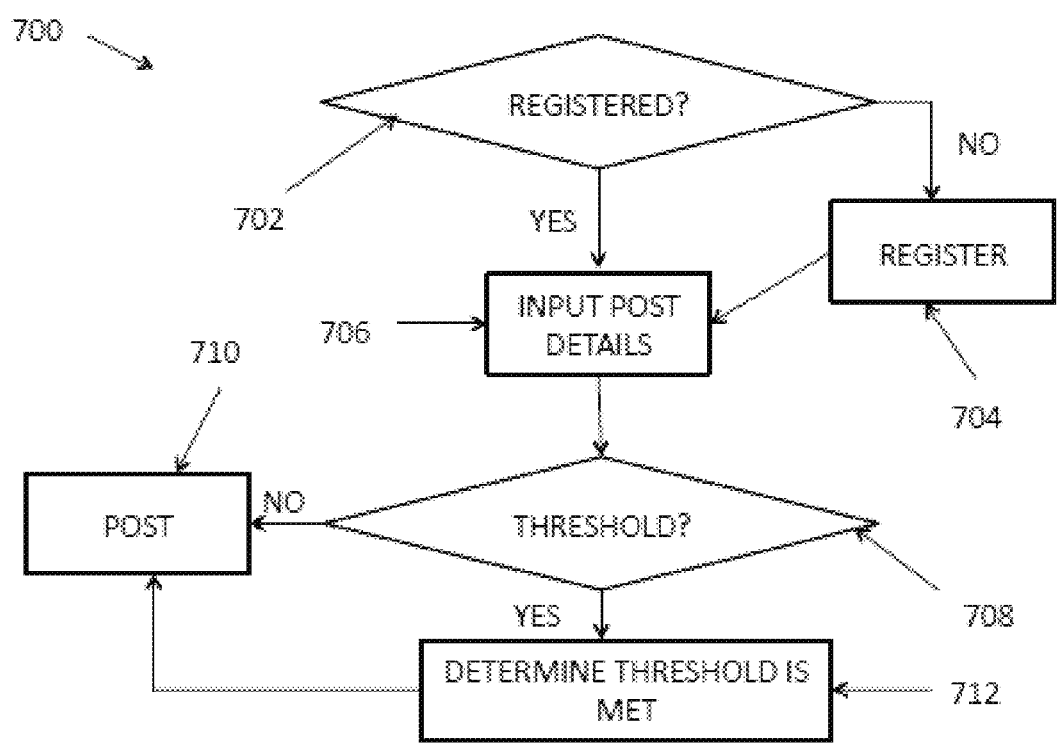
FIG. 7 is a flow chart of an example process for participating within an electronic communications event.

FIG. 7 is a flow chart of an example process 700 for participating within an electronic communications event. In embodiments, process 700 may be performed by client device 144 and/or electronic communications platform 146.

In embodiments, a user may decide that they would like to participate in an electronic communications event. Accordingly, the user may use electronic communications platform 146 to enter one or more selections to participate in the electronic communications event. At step 702, electronic communications platform 146 may determine whether the user is registered. If the user is not registered (step 702—NO), then electronic communications platform 146 may register the user and then allow the user to input post details at step 706. If the user is registered (step 702—YES), then electronic communications platform 146 may input post details at step 706.

At step 706, the user, using electronic communications platform 146, may enter post details for an electronic communications post that will be associated with an electronic communications event. In embodiments, the post may include photos, video, audio files, text, web page link, a Uniform Resource Locator (URL), or any other information. Once the electronic communications post has been created, electronic communications platform 146 may determine, at step 708, whether there is a threshold requirement. If there is no threshold requirement (step 708—NO), then, at step 710, the electronic communications post is made a part of the electronic communications event. If there is a threshold (e.g., buy-in amount) requirement (step 708—YES), then electronic communications platform 146 may determine, at step 712, whether the user has sufficient tokens or things of value associated with the user's account. If there are sufficient tokens or things of value, then the user may proceed with posting the electronic communications post at step 710. If there are not sufficient tokens or things of value, then the user may use another account or the user may be alerted that there is an error that requires resolution by the user prior to posting the electronic communications post. In embodiments, even if the threshold is met, the user may decide not to post the electronic communications post and, accordingly, the tokens or things of value are provided back to the user's account.

Figure 8:
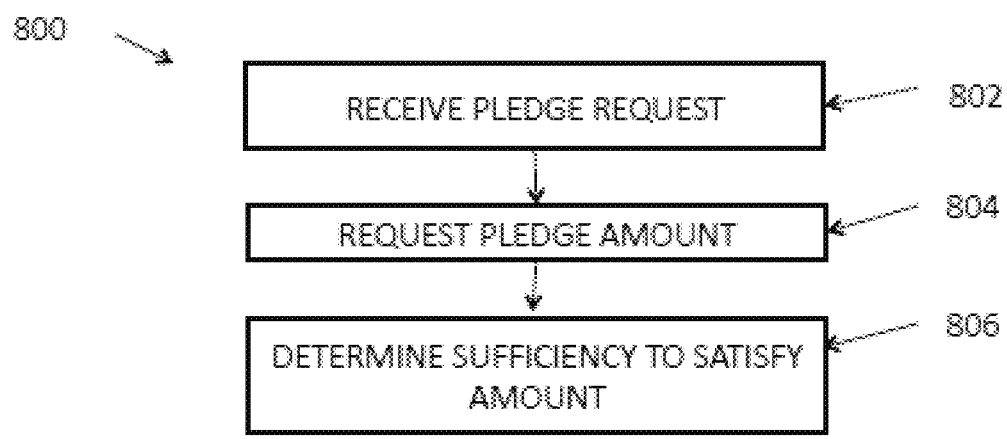
FIG. 8 is a flow chat of an example process for interacting with an electronic communications post.

FIG. 8 is a flow chat of an example process 800 for interacting with an electronic communications post. In embodiments, process 800 may be performed with electronic processing and communications transactions by electronic communications platform 146, client device 144, and/or any other device as described in FIG. 1.

In embodiments, at step 802, electronic communications platform 146 may receive a request from a user who would like to pledge tokens or things of value to an electronic communications post. At step 804, electronic communications platform 146 may request a pledge value which is associated with tokens or with things of value. At step 806, electronic communications platform 146 may determine whether the user has sufficient tokens or things of value to provide for the pledge value. In embodiments, electronic communications platform 146 may satisfy the pledge value by using an account associated with the electronic communications platform 146. In embodiments, electronic communications platform 146 may automatically update an electronic balance stored by electronic communications platform 146 by electronically changing the electronic balance by the amount pledged to a particular electronic communications post.

However, there may be an insufficient electronic balance in the electronic account or there is no electronic account associated with electronic communications platform 146. As such, electronic communications platform 146 may receive the pledge value by communicating with another computer application device that may store a third-party account (e.g., another web-based computer application, a cellular phone application, etc.) accessible by electronic communications platform 146. In embodiments, a user may have stored information about the third-party electronic account in electronic communications platform 146. If a user is unable to satisfy the pledge value, then the user may be notified and the pledge amount is not posted. If the pledge value is satisfied, then the user is notified and the pledge amount is posted to a particular electronic communications post.

Figure 9:
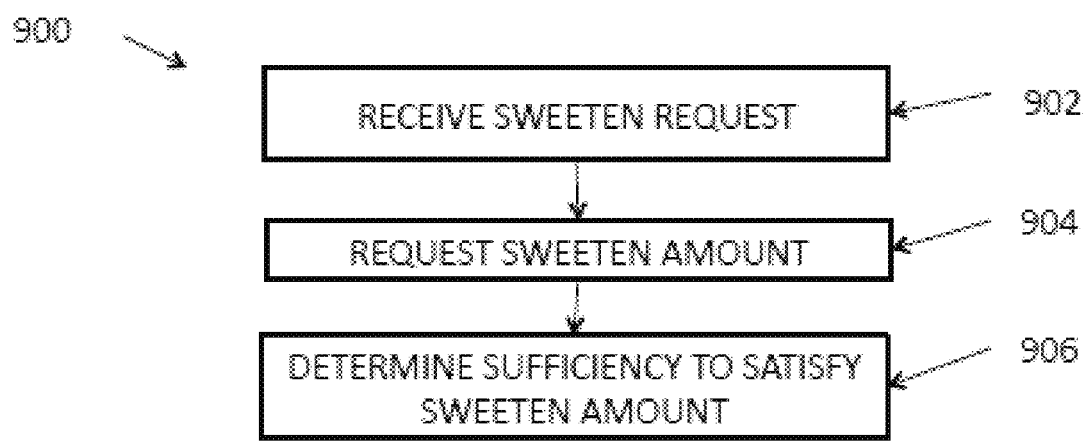
FIG. 9 is a flow chart of another example process for interacting with an electronic communications post.

FIG. 9 is a flow chat of an example process 900 for interacting with an electronic communications event. In embodiments, process 900 may be performed with electronic processing and communications transactions by electronic communications platform 146, client device 144, and/or any other device as described in FIG. 1.

In embodiments, at step 902, electronic communications platform 146 may receive a request from a user who would like to pledge tokens or things of value for a sweeten value to associate with an electronic communications event. At step 904, electronic communications platform 146 may request a sweeten value which is associated with tokens or with things of value. At step 906, electronic communications platform 146 may determine whether the user has sufficient tokens or things of value to provide for the sweeten value. In embodiments, electronic communications platform 146 may satisfy the sweeten value by using an account associated with the electronic communications platform 146. In embodiments, electronic communications platform 146 may automatically update an electronic balance by electronic communications platform 146 by electronically changing the electronic balance by the sweeten amount pledged to a particular electronic communications event.

However, there may be an insufficient electronic balance in the electronic account or there is no electronic account associated with electronic communications platform 146. As such, electronic communications platform 146 may receive the sweeten value by communicating with another computer application device that may store a third-party account accessible by electronic communications platform 146. In embodiments, a user may have stored information about the third-party electronic account in electronic communications platform 146. If a user is unable to satisfy the sweeten value, then the user may be notified and the sweeten amount is not posted. If the sweeten value is satisfied, then the user is notified and the sweeten amount is posted to a particular electronic communications event.

In embodiments, the sweeten amount may increase the electronic value of a particular electronic communications event, but may not increase the ranking of any electronic communications posts. Accordingly, ORM 122, database server 110, and/or electronic communications platform 146 may prevent an electronic computing update to the electronic communications post. Thus, the electronic communications event may receive additional increase in value, but the posts within receive no increase in rank. As such, one or more of the computing devices in FIG. 1 electronically increase the overall value of the electronic communications event without increasing the ranking value of any particular electronic communications post. In embodiments, the sweeten value is associated with electronic code that is sent from electronic communications platform 146 to ORM 122 and/or database server 110 which electronically determines that the electronic code indicates no electronic updates are made to any electronic communications post. Accordingly, this may result in a reduction in electronic communications and stored values associated with an electronic communications post's ranking.

Figure 10:
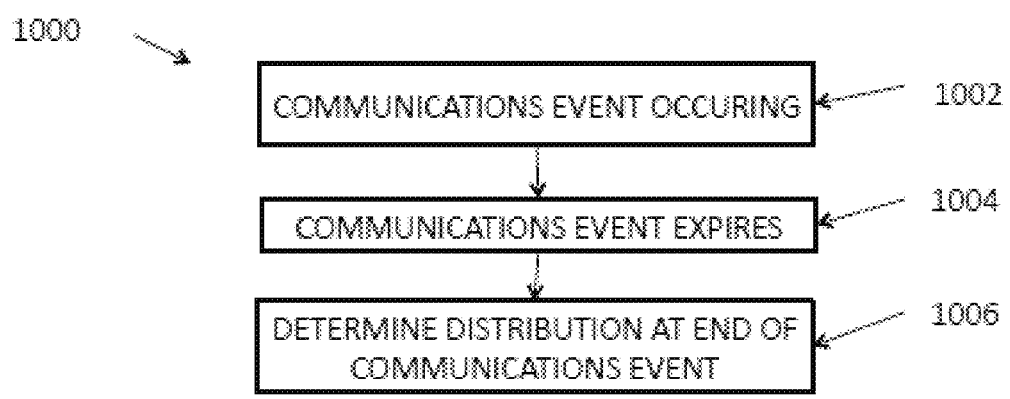
FIG. 10 is a flow chart of an example process relating to the expiration of an electronic communications event.

FIG. 10 is a flow chart of an example process 1000 relating to the expiration of an electronic communications event. In embodiments, process 1000 may be performed with electronic processing and communications transactions by electronic communications platform 146, client device 144, and/or any other device as described in FIG. 1.

At step 1002, an electronic communications event is occurring. At step 1004, the electronic communications event expires and no additional votes, pledges, and/or texts can be associated with any electronic communications post associated with the electronic communications event. At step 1006, any value associated with the electronic communications event is calculated. If the value is greater than zero, then the value is distributed. In embodiments, the value may be distributed between a beneficiary, the user who created the electronic communications event, and the creators of electronic communications platform 146. In alternate embodiments, the value may be distributed between a user who created a successful electronic communications post, the user who created the electronic communications event, and the creators of electronic communications platform 146. In embodiments, a user who receives a portion of the value, based on a successful electronic post, may be requested (e.g., via an electronic message—SMS, email, etc.) to give a percentage of their portion to an organization, such as a charity. As a result, a charity may receive a portion of the value without having been a beneficiary of the electronic communications event.

FIGS. 11-17 are screen shots of example electronic pages associated with creating electronic communications posts associated with an electronic communications event. In embodiments, the example screen shots are associated with electronic pages (e.g., web pages) that can be displayed on an electronic graphical user interface that is part of an electronic communications platform 146 stored by client device 144. In embodiments, FIGS. 11-17 describe screen shots of electronic pages that are part of electronic communications platform 146 and are used to create and edit electronic communication posts as well as being able to interact with electronic communication posts via electronic tokens or things of value (e.g., something can be used to purchase goods). Accordingly, FIGS. 11-17 describe how user experience is enhanced by creating a competitive environment that results in greater interactions between users through the use of electronic communication events and/or electronic communication posts. In embodiments, FIGS. 11-17 describe electronic interactions (e.g., pledging, voting, posting, liking, etc.) by users and/or devices as described in FIGS. 1-10. While FIGS. 11-17 describe screen shots of electronic pages that include individuals names, a user may interact (e.g., pledging, voting, posting) anonymously by using a user name, no user name, or another moniker that does not indicate the true identity of the user.

Figure 11:
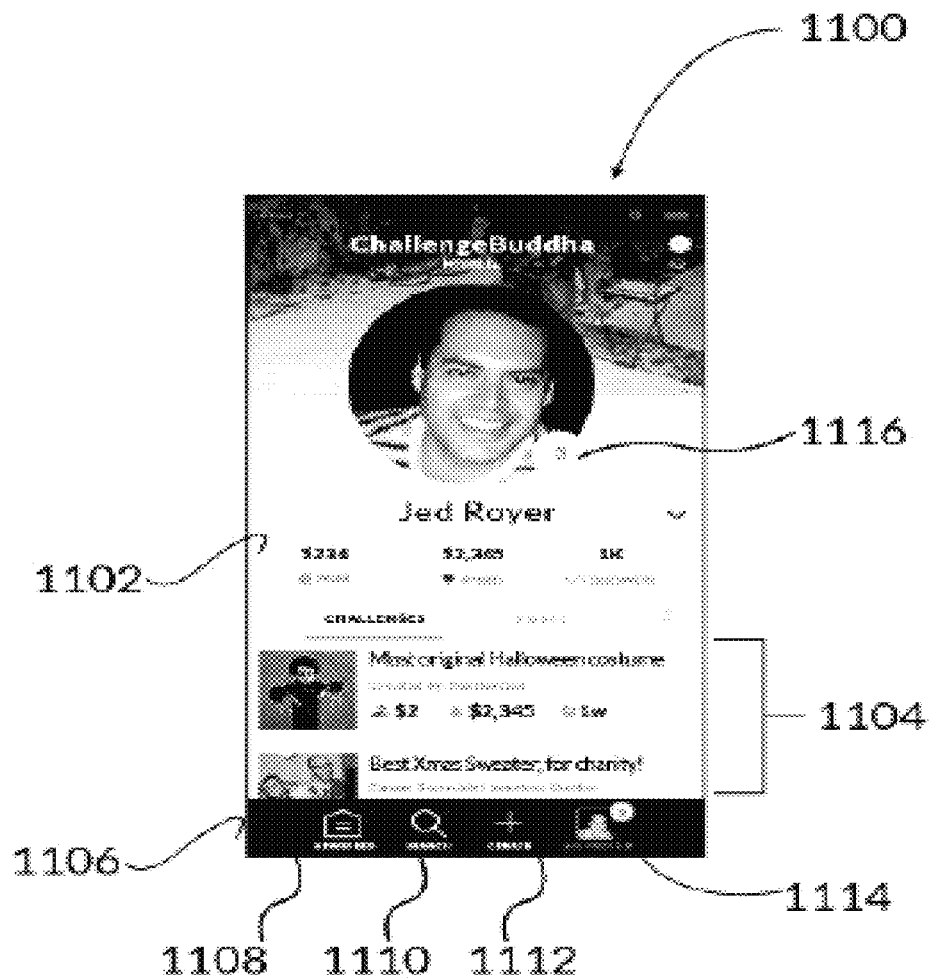
FIGS. 11-26 are screen shots of example electronic pages used for creating, sharing, and interacting with electronic communications posts that are associated with an electronic communications event.

FIG. 11 describes example screen shot 1100. In embodiments, screen shot 1100 is an example profile page associated with electronic communications platform 146. As shown in screen shot 1100, the user name is "Challenge Buddha." Also, as shown in screen shot 1100, portion 1102 includes "amount won," "raised," and "followers." In embodiments, "amount won" indicates electronic tokens or things of value that have been given to the user based on their participation in one or more electronic communications events. In embodiments, "raised" indicates the amount raised by the user via one or more electronic communications posts and/or events. In embodiments, "followers" indicates the number of other users who are notified, via electronic communications, of the activities and actions of this particular user. In embodiments, screen shot 1100 also includes portion 1104 which describes different electronic communications posts that the user has participated. As shown in screen shot 1100, the electronic communications posts and/or electronic communications events include "Most original Halloween costume" and "Best Xmas Sweater for charity!" In embodiments, screen shot 1100 also includes portion 1106 which includes icon 1108 for newsfeed, icon 1110 for search, icon 1112 for create, icon 1114 for the user profile page, and icon 1116.

Figure 16:
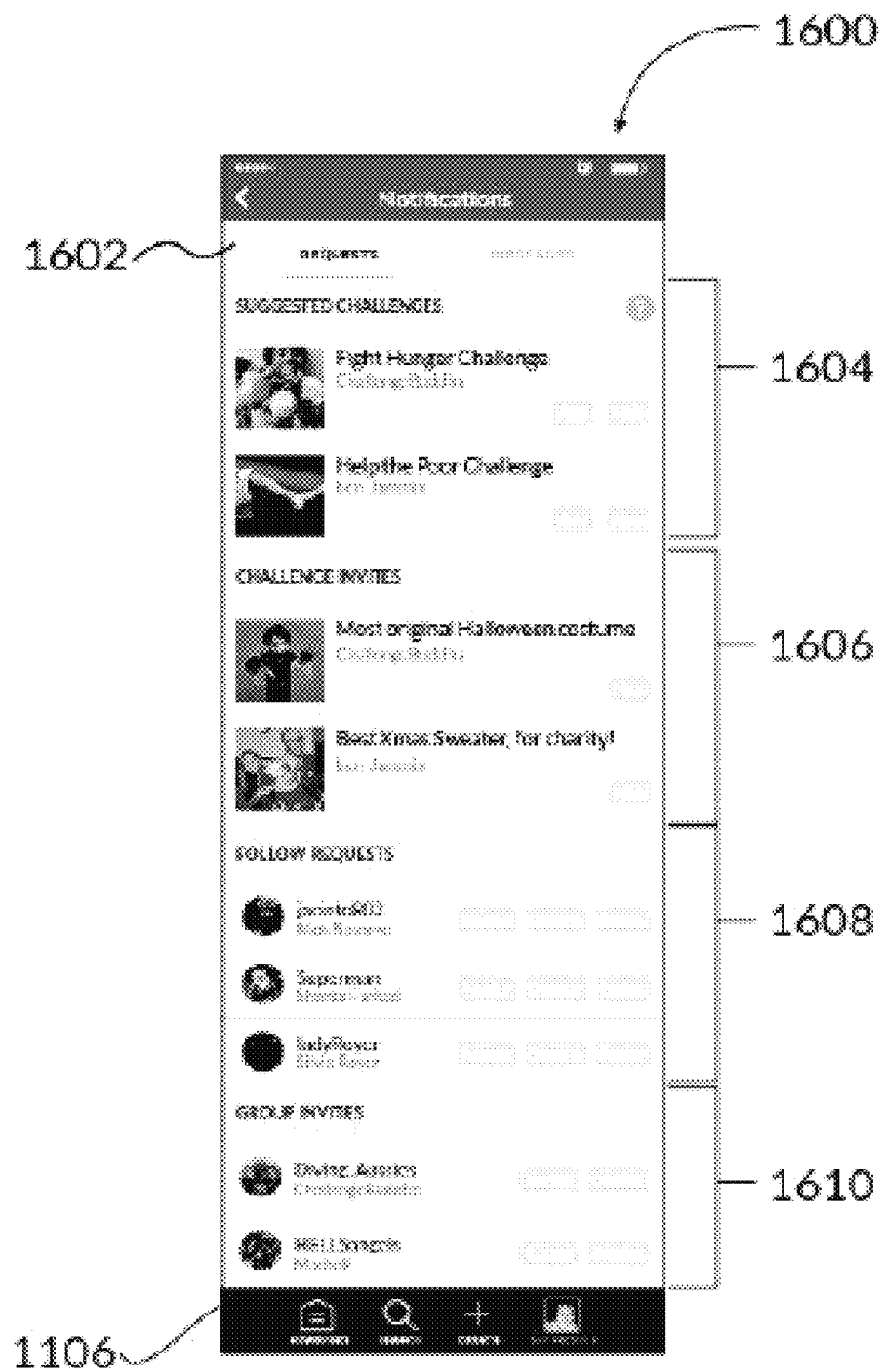
Figure 17:
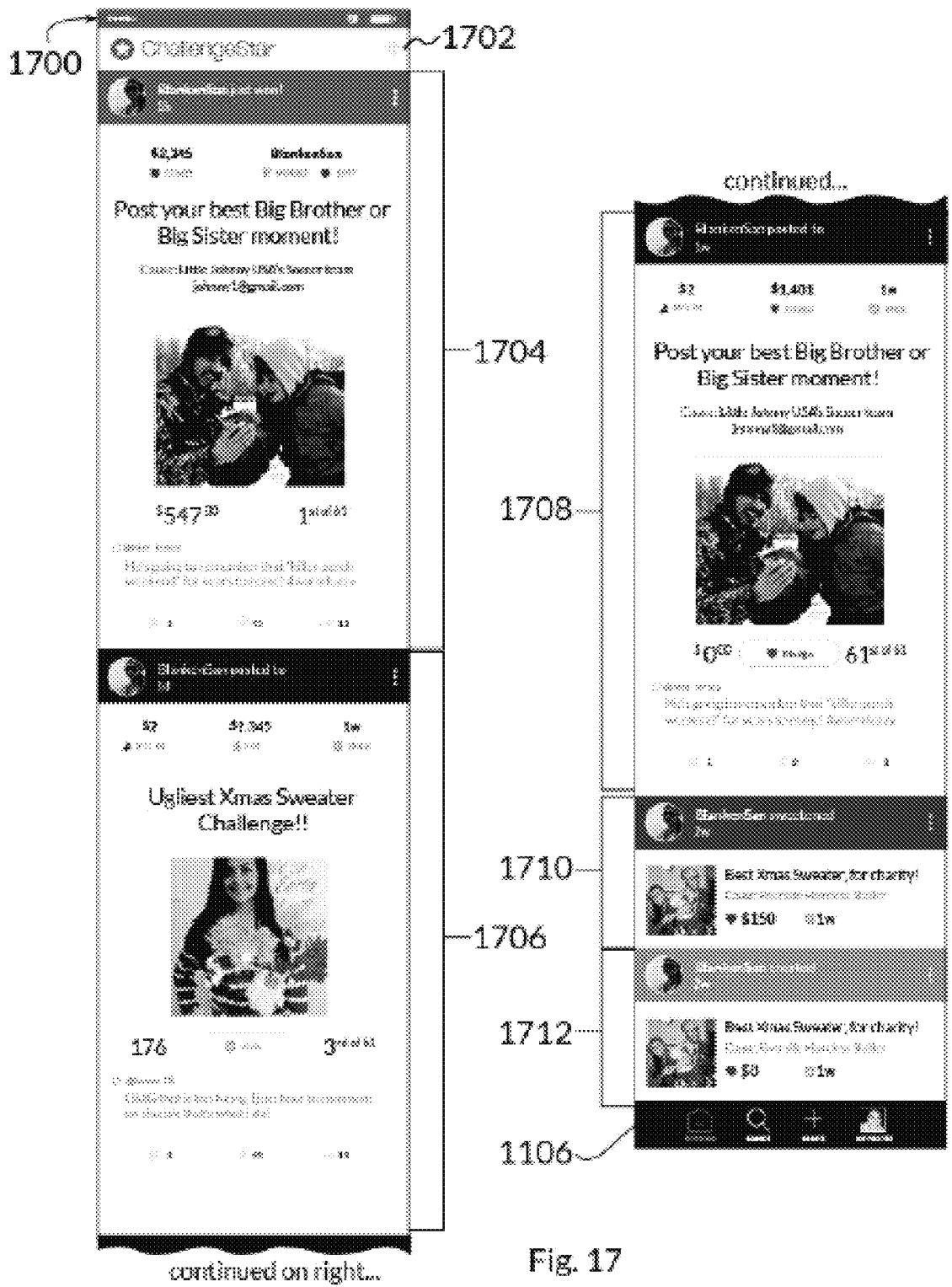

In embodiments, when a user selects icon 1108, electronic communications platform 146 may electronically transfer the user from the display screen to an electronic newsfeed screen, such as screen shot 1700 described in FIG. 17. In embodiments, when a user selects icon 1110, electronic communications platform 146 may electronically transfer the display screen to a search screen, such as screen shot 1400 described in FIG. 14. In embodiments, when a user electronically selects icon 1112, the user may create a challenge on an electronic page, such as screen shot 1200 described in FIG. 12. In embodiments, when a user selects icon 1114, the screen is electronically changed to the user profile page, such as screen shot 1100 described in FIG. 11. In embodiments, when a user electronically selects icon 1116, the screen is electronically changed to a notifications page, such as screen shot 1600 described in FIG. 16. As shown in FIG. 11, icon 1116 may include a number which indicates the number of notifications. In embodiments, if there are no notifications, icon 1116 may not be shown on screen shot 1100.

Figure 12:
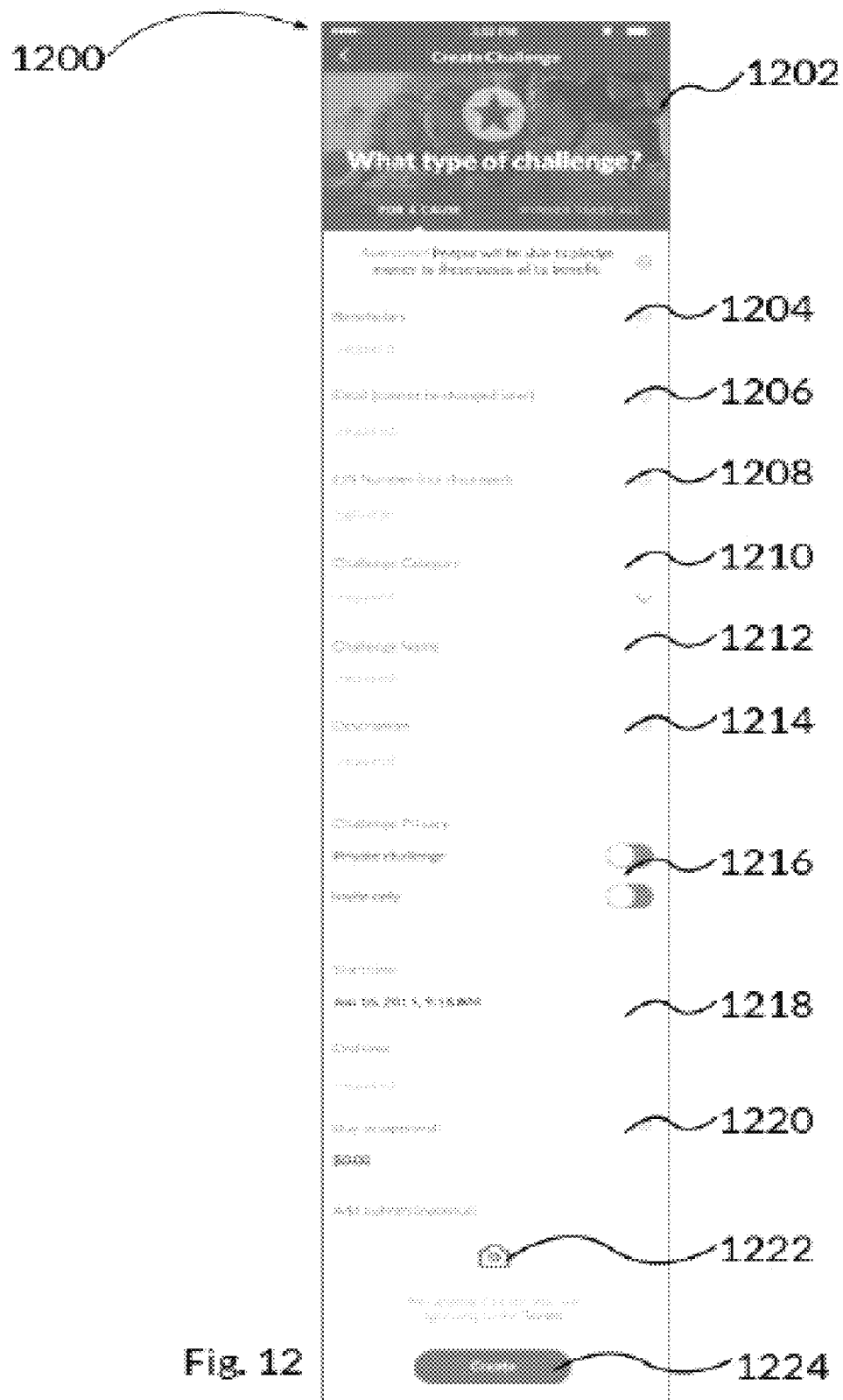

FIG. 12 describes example screen shot 1200. In embodiments, screen shot 1200 may describe an example electronic page (e.g., web page) that is used to create an electronic communications event via electronic communications platform 146. In embodiments, screen shot 1200 includes portions 1202, 1204, 1206, 1208, 1210, 1212, 1214, 1216, 1218, 1220, 1222, and 1224.

In embodiments, portion 1202 may be associated with determining type of electronic communications event. For example, the electronic communications event may be for a charity or may be for a personal challenge where individuals compete against each other for electronic tokens or things of value. For example screen shot 1200, the electronic communications event has been selected to be part of a charity. In embodiments, portion 1204 may include information about a particular beneficiary (e.g., a charity). Electronic communications platform 146 may receive a name or identifier that can be used to identify and/or verify the beneficiary. In embodiments, the creation of the electronic communications event (e.g., a challenge or winner takes or all) allows for the excitement of competition to cause users to participate at greater levels in an electronic communications system by (i) creating a competition of users' electronic communication posts, (ii) and also by voting, liking, and/or providing (or receiving) electronic tokens associated with the electronic communications posts. As such, this results in a greater number of individuals participating in the electronic communications event which aggregates the amount of electronic tokens and/or electronic transactions that can be raised for an individual or charitable event.

In embodiments, portion 1206 may include a request for information about the beneficiary's email address. In embodiments, portion 1208 may include a request for information about the beneficiary's governmental identifier. In embodiments, portion 1210 may include a request for information about the category (e.g., a medical charity, a children's charity, etc.) associated with the electronic communications event. In embodiments, portion 1212 may include a request for a name for the electronic communications event. In embodiments, portion 1214 may include a request for a description of the electronic communications event (e.g., background of the charity, background of the user, etc.). In embodiments, portion 1216 may include privacy settings associated with the electronic communications event. For example, a user may select that the electronic communications event is private and may not be viewed publicly by other users (e.g., users who are not followers of the user, users who are not members of a particular group). In embodiments, portion 1216 may also include an invite setting that allows the electronic communications event to be accessible by invite only.

In embodiments, portion 1218 may include a request for a start and end time for the electronic communications. For example, the electronic communications event may start on Monday at 11:18 a.m. and end one the same day at 11:30 p.m. Alternatively, the electronic communications event may start at a later time (e.g., a delayed start time) that is pre-determined by the user, as described in FIG. 6. In embodiments, portion 1220 may include a request for a threshold value for other users to participate in the electronic communications event. In embodiments, portion 1222 may include a request for a photo or video. In embodiments, the photo or video may be obtained by electronic communications platform 146 from client device 144 or from another device, such as social network 140.

In embodiments, portion 1224 may include a request to create the electronic communications event. In embodiments, any portions of screen shot 1200 that are not included may result in an error and electronic communications platform 146 may request the user to provide any missing information.

Figure 13:
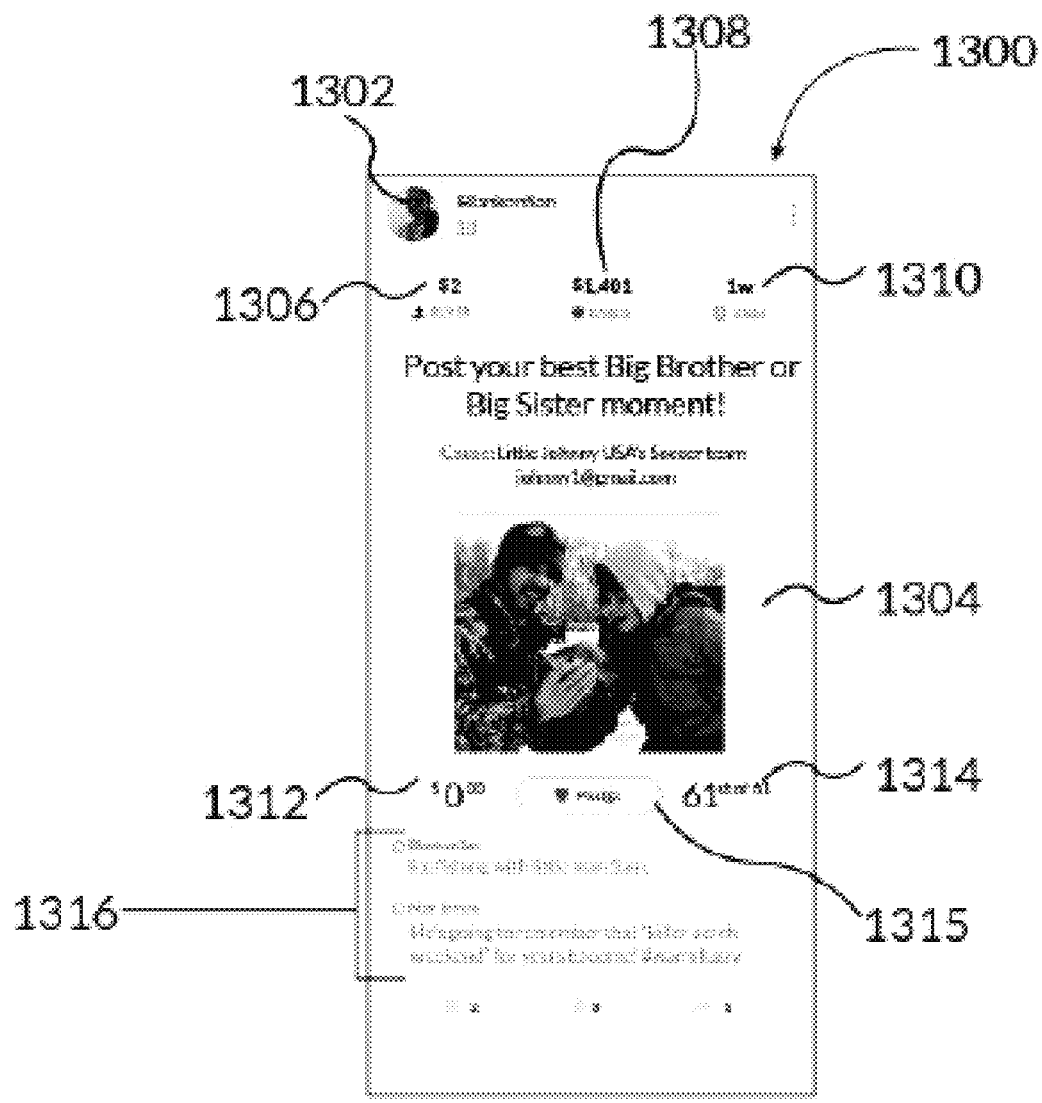

FIG. 13 describes example screen shot 1300. As shown in example screen shot 1300, there is portion 1302, post 1304, portion 1306, portion 1308, portion 1310, portion 1312, portion 1314, portion 1315 and portion 1316. In embodiments, portion 1302 describes a user who most recently interacted with post 1304. As shown in screen shot 1300, a user interacted with post 1304 about one day ago. In embodiments, post 1304 may be an electronic communications post that is created by a user who created an electronic communications event or another user who is also participating in the electronic communications event. As shown in screen shot 1300, post 1304 includes a photo, a title ("Post your Best Big Brother or Big Sister Moment"), and a cause ("Little Johnny USA's Soccer Team"). In portion 1316, other users may input comments and, as a result, edit the electronic communications post.

In post 1304, portion 1306 indicates the threshold amount to participate in the electronic communications event if a user wishes to create their own electronic communications post. In embodiments, portion 1308 may indicate the total value of pledges and sweetens associated with an electronic communications event. In embodiments, portion 1310 indicates the amount of time remaining to interact with event. In embodiments, portion 1312 indicates the amount that the user has raised with this post 1304. If the user wishes to pledge a value, then the user may enter select portion 1315 and pledge the desired value as described in FIG. 8. In embodiments, portion 1316 may indicate the rank of post 1304 ("61$^{st}$ of 61"). In embodiments, information entered into screen shot 1300 may be sent and stored in one or more of the databases in database server 100, as described in FIG. 2.

Figure 14:
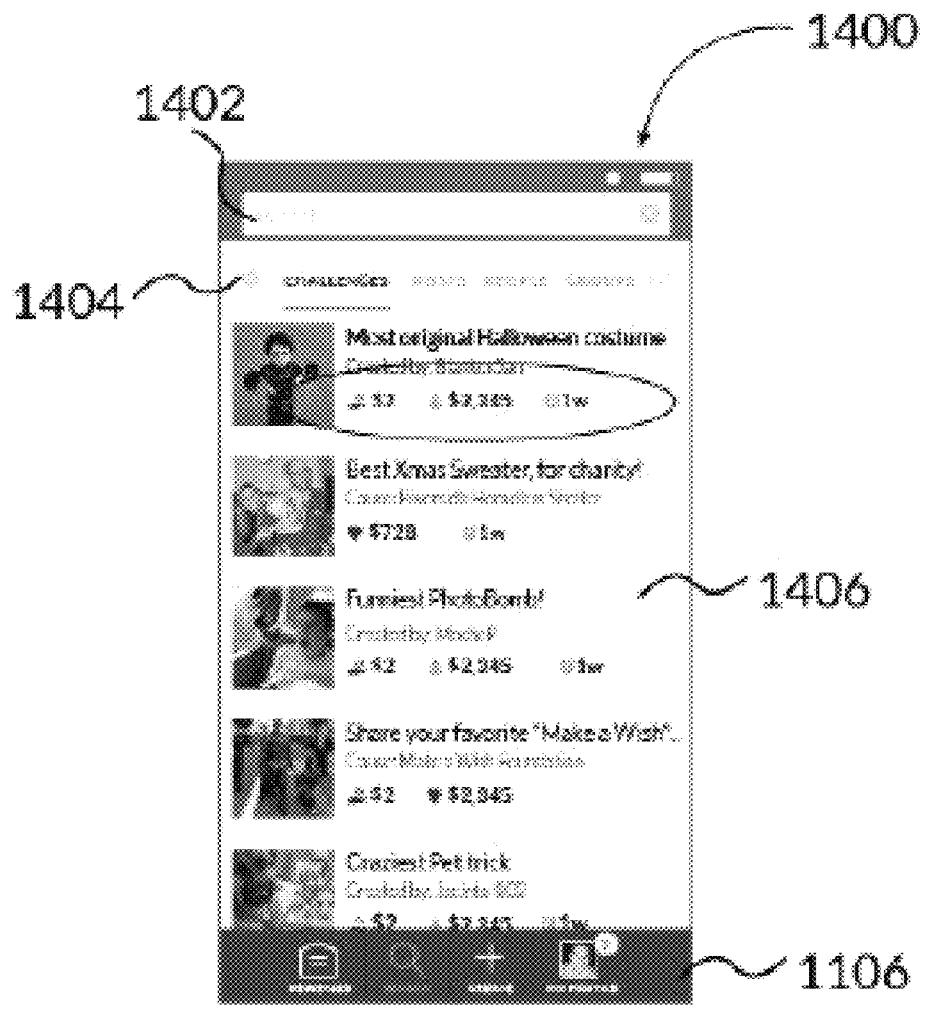

FIG. 14 describes example screen shot 1400. As shown in example screen shot 1400, an electronic page indicating searching capabilities is provided. In embodiments, screen shot 1400 may include portion 1402, portion 1404, portion 1406, and portion 1106 which is described in FIG. 11. In embodiments, portion 1402 allows for an electronic communications platform 146 to receive alphabetical and/or numerical inputs from a user. In embodiments, whatever is entered into portion 1402 is used by electronic communications platform 146 to search for electronic communications posts and/or electronic communications events. In embodiments, portion 1404 allows for electronic communications platform 146 to provide further searching capabilities to a user. As shown, a user can select a search based on "challenges" (e.g., communications events), "posts," "people," and/or groups." For example, if electronic communications platform 146 receives a request to search based on "challenges," electronic communications platform 146 will search for electronic communications events associated with the search terms entered into portion 1402. For example, if electronic communications platform 146 receives a request to search based on "posts," then electronic communications platform 146 will search for electronic communications posts, associated with any type of electronic communications event, that include the desired search terms. In embodiments, portion 1406 includes results of a search as shown in portion 1406.

Figure 15:
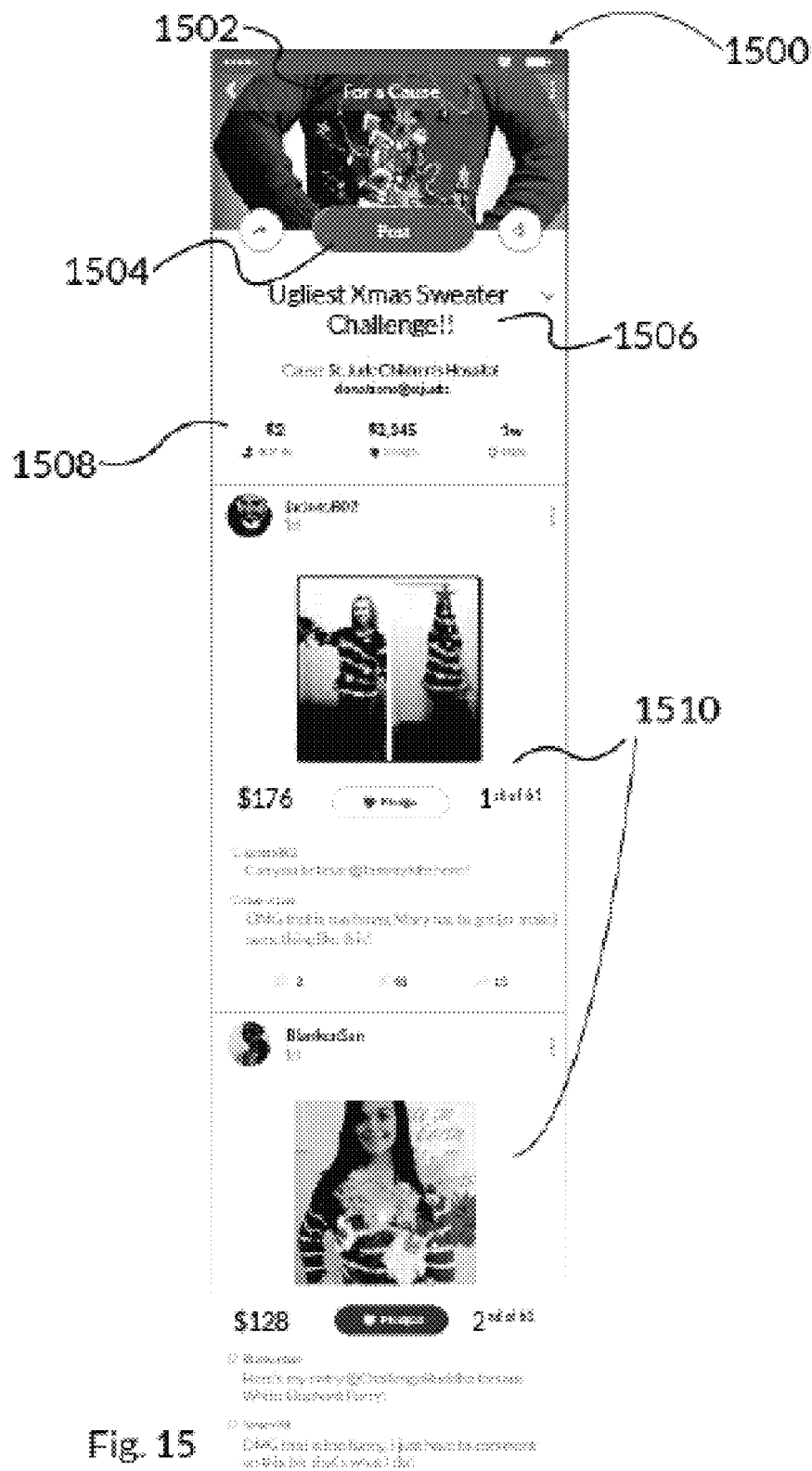

FIG. 15 describes example screen shot 1500. In embodiments, screen shot 1500 describes a particular electronic communications event and displays two electronic communications posts associated with that particular electronic communications event. As shown in portion 1502, screen shot 1500 indicates that the electronic communications event is a "charity challenge" which indicates that the value associated with the electronic communications event is being given to a charity. In embodiments, portion 1504 provides an option to post an electronic communications post. In embodiments, portion 1506 indicates the title of the electronic communications event ("Ugliest Xmas Sweater Challenge!!"). In embodiments, portion 1508, the amount required to enter the electronic communications event is provided, the amount already pledged to the electronic communications event, and the remaining time associated with interacting in the electronic communications event. In embodiments, portion 1510 shows different electronic posts associated with the electronic communications event, "Ugliest Xmas Sweater Challenge!!" Accordingly, a user may vote, like, share, provide electronic tokens, comments, and/or other electronic interactions with one or more of the electronic communications posts shown in screen shot 1500.

FIG. 16 describes example screen shot 1600. As shown in example screen shot 1600, a user is displayed an electronic notifications page that is electronically generated by electronic communications platform 146. In embodiments, example screen shot 1600 includes portions 1602, 1604, 1606, 1608, 1610, and portion 1106 as described in FIG. 11.

In embodiments, portion 1602 allows electronic communications platform 146 to graphically present two types of notifications to a user. This may include "requests" and "messages." As shown in example screen shot 1600, the electronic communications protocol 146 has received an electronically generated command that the user wants to view requests.

In embodiments, portion 1604 shows "suggested challenges." In embodiments, "suggested challenges" are recommendations for electronic communications events that are electronically determined by ORM 122 (as described in FIG. 1) and/or database server 110 (as described in FIGS. 1 and 2), based on prior activities of the user within the environment of electronic communications platform 146. As shown in portion 1604, the suggestions include "fight hunger challenge and "help the poor challenge." In embodiments, the user, in the past, may have provided information (e.g., profile information, received social network information, group affiliation, etc.) about interests in charities associated with hunger and poverty issues. In embodiments, a user that selects a particular "suggested challenges" may then be displayed an electronic graphical screen that allows for the user to participate in the challenge by creating their own electronic communications post and/or voting, liking, providing electronic tokens, comments, sharing, and/or other electronic interactions with one or more of the electronic communications posts.

In embodiments, portion 1606 shows "challenge invites." In embodiments, "challenge invites" may be invites for other users of electronic communications platform 146 being used on other client devices 144. For example, a friend may be performing a "most original Halloween costume" challenge (i.e., an electronic communications event) and has sent an electronic communication inviting the user. In embodiments, a user that selects a particular "challenge invite" may then be displayed an electronic graphical screen that allows the user to participate in the challenge by creating their own electronic communications post and/or voting, liking, providing electronic tokens, comments, sharing and/or other electronic interactions with one or more of the electronic communications posts.

In embodiments, portion 1608 shows "follow requests." In embodiments, "follow requests" allows for a user to receive requests from other users who wish to follow the user. In embodiments, the user may have a privacy setting that prevents other users from following or viewing the user's electronic activities on electronic communications platform 146. In embodiments, the user can allow other users to follow and view the user's electronic activities (e.g., likes, comments, electronic communication posts, group membership, etc.) on electronic communications platform 146. In embodiments, the user has the option of "allow," "decline," and "follow."

If the user electronically selects "allow," then the follow request is accepted and the other user can follow. In embodiments, the selection of "allow" removes that particular follow request from the notifications electronic graphical screen. If the user electronically selects "decline," then the follow request is declined and the other user cannot follow the user. In embodiments, the electronic selection of "decline" removes that particular follow request from the notifications electronic graphical screen. If the user electronically selects "follow," then the user can follow the other user that made the follow request. However, the other user still cannot follow and, thus, cannot view the activities of the user within electronic communications platform 146. In embodiments, the electronic selection of "follow" does not remove that particular follow request from the notifications electronic graphical screen. In embodiments, the electronic selection of "follow" may generate electronic code that includes instructions to electronic communications platform 146 to prevent the removal of the follow request from the display screen of client device 144.

In embodiments, portion 1610 shows "group invites." In embodiments, portion 1610 shows invites from groups that are interested in the user joining their electronic group within the environment of electronic communications platform 146. In embodiments, the invites from groups may be sent from another user associated with the electronic group. In embodiments, once the user selects a particular group invite, the user will become a part of that group and receive updates and challenges associated with that particular group.

FIG. 17 describes example screen shot 1700. As shown in example screen shot 1700, a user is displayed an electronic newsfeed by electronic communications platform 146. In embodiments, example screen shot 1700 includes portions 1702, 1704, 1706, 1708, 1710, 1712, and portion 1106 which is described in FIG. 11.

In embodiments, portion 1702 describes an area of the screen that includes the ability for a user to electronically sort the results (content) of the electronic newsfeed. In embodiments, the electronic newsfeed includes information about various electronic communications events (i.e., challenges) that the user has requested updated information. Thus, the electronic newsfeed can aggregate multiple electronic communications posts and show changes to each electronic communications posts simultaneously with changes (e.g., updates to votes, likes, electronic tokens, comments, multimedia, shares, etc.) to each electronic communications post as it occurs on someone else's electronic newsfeed and/or timeline being electronically displayed on a different client device 144. In embodiments, the electronic newsfeed may be in chronological order, such that either the oldest or newest electronic communications post updates are provided first in the newsfeed. Alternatively, the electronic newsfeed may be in order of types of events. Thus, for example, votes, likes, and pledges appear first and then other activities by the user appear next, or vice versa. Alternatively, the electronic newsfeed may be used to show the activities in some chronological order of another user. Thus, for example, a first user can view on their electronic newsfeed the electronic activities, within electronic communications platform 146, of a second user such that the activities of the second user are shown in the same way, simultaneously, on the first user's electronic newsfeed as they are being shown on the second user's electronic timeline. In embodiments, a user can also electronically interact with the newsfeed and select a particular electronic communications post for participation (e.g., liking, sharing, providing electronic tokens, providing comments, providing multimedia content, etc.).

In embodiments, portion 1704 describes an electronic communications post ("Post your Best Big Brother or Big Sister Moment)" which includes information about the charitable cause, amount of electronic tokens raised, the ranking of the electronic communications post, and any comments. As shown, the update to portion 1704 occurred one hour ago. In embodiments, portion 1706 describes an electronic communications post ("Ugliest Xmas Sweater Challenge") which includes information about a challenge, not a charitable cause, amount of electronic tokens raised, the ranking of the electronic communications post, and any comments. As shown, the update to portion 1706 occurred one day ago and was a posting (e.g., like, vote, comments) by a user, "BlankenSan" who is being followed by the user of the newsfeed.

In embodiments, portion 1708 describes an update to the electronic communications post "Post your Best Big Brother or Big Sister Moment" that occurred one week ago. In embodiments, the update was a posting made by the user "BlankenSan." In embodiments, portion 1710 describes an update made by the user "BlankenSan" to the electronic communications event "Best Xmas Sweater for Charity" which included a sweeten amount (such as described in FIG. 9). In embodiments, portion 1712 describes the creation of the electronic communications event "Best Xmas Sweater for Charity" by the user "BlankenSan," about two weeks ago.

FIGS. 18-26 describe example screen shots 1800, 1900, 2000, 2100, 2200, 2300, 2400, 2500 and 2600. In embodiments, the example screen shots are associated with electronic pages (e.g., web pages) that can be displayed on an electronic graphical user interface that is part of an electronic communications platform 146 stored by client device 144 or displayed within a electronic page displayed by client device 144. In embodiments, FIGS. 18-26 describe screen shots of electronic pages that are part of electronic communications platform 146 and/or a webpage and are used to create and edit electronic communication posts as well as being able to interact with electronic communication posts via electronic communications to transmit electronic tokens or things of value (e.g., something can be used to purchase goods). Accordingly, FIGS. 18-26 describe how user experience is enhanced by creating a competitive environment that results in greater interactions between users through the use of electronic communication events and/or electronic communication posts and between different types of computer-based application (e.g., between electronic communications platform 146 and other types of computer-based applications, such as other mobile or web applications). In embodiments, FIGS. 18-26 describe electronic interactions (e.g., pledging, voting, posting, liking, etc.) by users and/or devices as described in FIGS. 1-17. While FIGS. 18-26 describe screen shots of electronic pages that include individuals names, a user may interact (e.g., pledging, voting, posting) anonymously by using a user name, no user name, or another moniker that does not indicate the true identity of the user.

Figure 18:
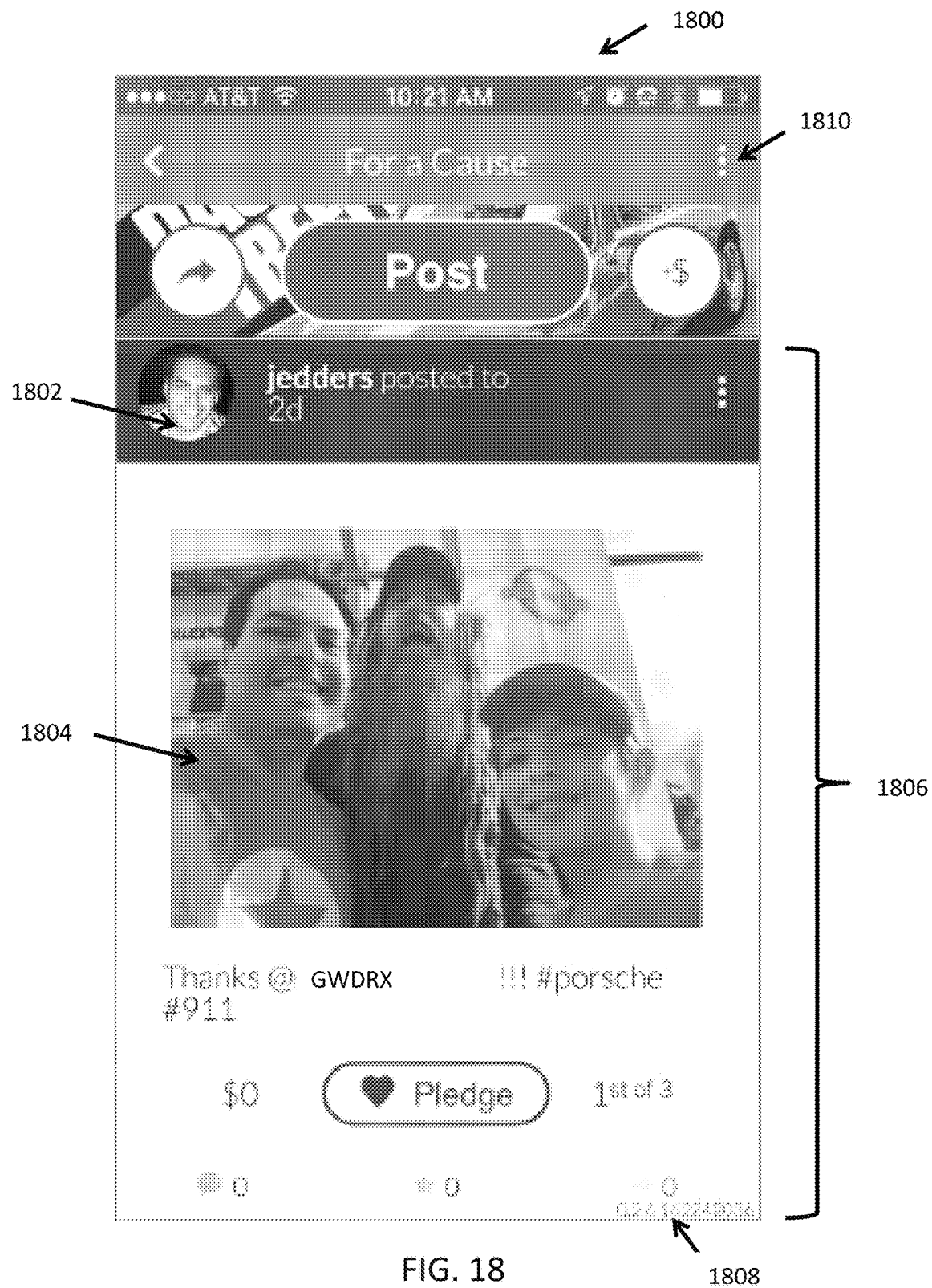

FIG. 18 shows example screen shot 1800 which describes an example electronic communications post associated with a particular electronic communications event. As shown in screen shot 1800, there is a post icon 1802, an image 1804, portion 1806, share icon 1808, and icon 1810. In embodiments, post icon 1802, when electronically selected, may result in the electronic communications post being shared with other users within an electronic communications event that is accessible through electronic communications platform 146 or a web-based application. In embodiments, a prior determination may have been about where the electronic communications post is to be sent based on options electronically selected by a user of client device 144. In embodiments, image 1804 may be a photo, a video, a graphics interchange format, GIF, or any other type of electronic multimedia imagery that can be displayed on a computing device, such as client device 144. In embodiments, portion 1806 may include one or more different types of information that may be similar to information as described in FIG. 15.

Figure 19:

In embodiments, share icon 1808, or icon 1810, when selected, may electronically share the electronic communications post in FIG. 18. As shown in FIG. 19, the user may be provided options 1902, 1904, 1906, and 1908. In embodiments, the selection of 1902 may result in the display of an electronic page known as a selection page. An example selection page is described in FIG. 20. In embodiments, the selection of 1904 may result in the user has a preference for this particular electronic communications post versus other electronic communications post. In embodiments, the selection of 1906 may result in the user sending an electronic report (e.g., a message) to a network administrator device associated with electronic communications platform 146 regarding any issues. In embodiments, the selection of 1908 may allow the user to cancel the request to share the electronic communications post.

Figure 20:
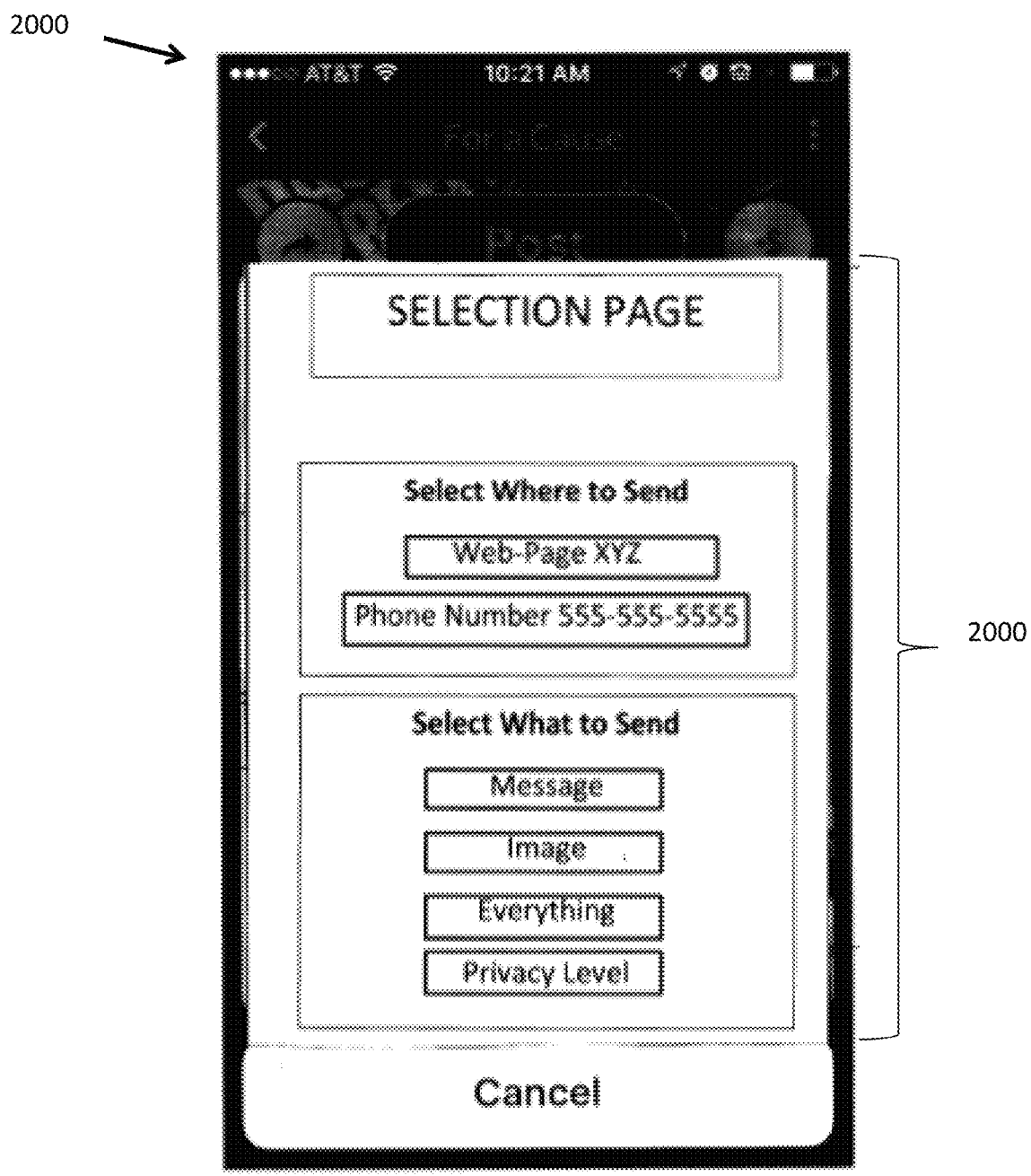

FIG. 20 shows example screen shot 2000. In embodiments, screen shot 2000 may be a selection page. The electronic display format of the selection page may include icons, associated with particular websites and applications, or other interactive graphical features that allow for sharing electronic information. In embodiments, the selection page includes different options that can be electronically selected to determine what electronic information is to be posted; and where the electronic information is to be posted. Accordingly, the selection page allows for sharing of electronic communications in electronic communications platform 146 with other communications systems, such as third-party web-based applications, email accounts, short message service, SMS, multimedia messaging service, MMS, etc.

In embodiments, the selection page may allow for what electronic information is to be posted. For example, the selection page provides the option to select one or more of the following electronic information to be electronically sent to another computer application and/or computing device: (i) an image (e.g., a photo, a graphics interchange format, GIF, a video, etc.); (ii) an amount of electronic tokens associated with an electronic communications event and/or electronic communications post; (iii) the electronic ranking information of the electronic communications post amongst all electronic communications posts associated with an electronic communications event; and (iv) a request for a donation (e.g., electronic token) to be associated with the electronic communications event.

In embodiments, the selection page may allow for where the electronic information is to be posted. For example, the selection page may include one or more of the following options on where the electronic communications post, as shown in FIG. 18, is to be electronically sent.

In embodiments, the options on where the electronic communications post is to be electronically sent may include electronically sending the electronic communications post to: (i) another electronic communications platform 146 residing on the same server as the electronic communications platform 146 associated with the electronic communications post described in FIG. 18; (ii) another electronic communications platform 146 residing on a different server than the electronic communications platform 146 associated with the electronic communications post described in FIG. 18; (iii) an email account, via, for example, email gateway 130 and one or more networks as described in FIG. 1; (iv) a SMS account, via, for example, SMS gateway 138 and one or more networks as described in FIG. 1; (v) a MMS account, via, for example, one more servers and networks as described in FIG. 1; (vi) a web-based application; (vii) a cellular-based system that allows for a user, using a cellular phone to make donations by using a keypad; and (viii) any other application that can receive electronic communications and display text, images, and/or other types of electronic information on a computing device, such as client device 144. In embodiments, the user can select one or multiple ways to share the electronic communications post.

In embodiments, the options on where the electronic communications posts are to be electronically sent may require entering a uniform resource locator, URL, associated with the electronic destination. Alternatively, electronic communications platform 146 may automatically retrieve the URL based on the identity of the electronic destination. In embodiments, the options on where the electronic communications posts are to be sent may require entering someone or something's identifier (e.g., name, company name, etc.). In embodiments, the options on where the electronic communications posts are to be sent may include a selection menu that is pre-populated with different selection options. In embodiments, the options on where the electronic communications posts are to be sent may include icons that include logos and/or images associated with web applications, mobile applications, and/or any type of electronic application that can receive/send electronic communications.

In embodiments, any selections made on the selection page may be cancelled while the selection page is displayed, or may be cancelled at a later time by selecting a cancel icon that deletes one or more selections made in the selection page.

Figure 21:
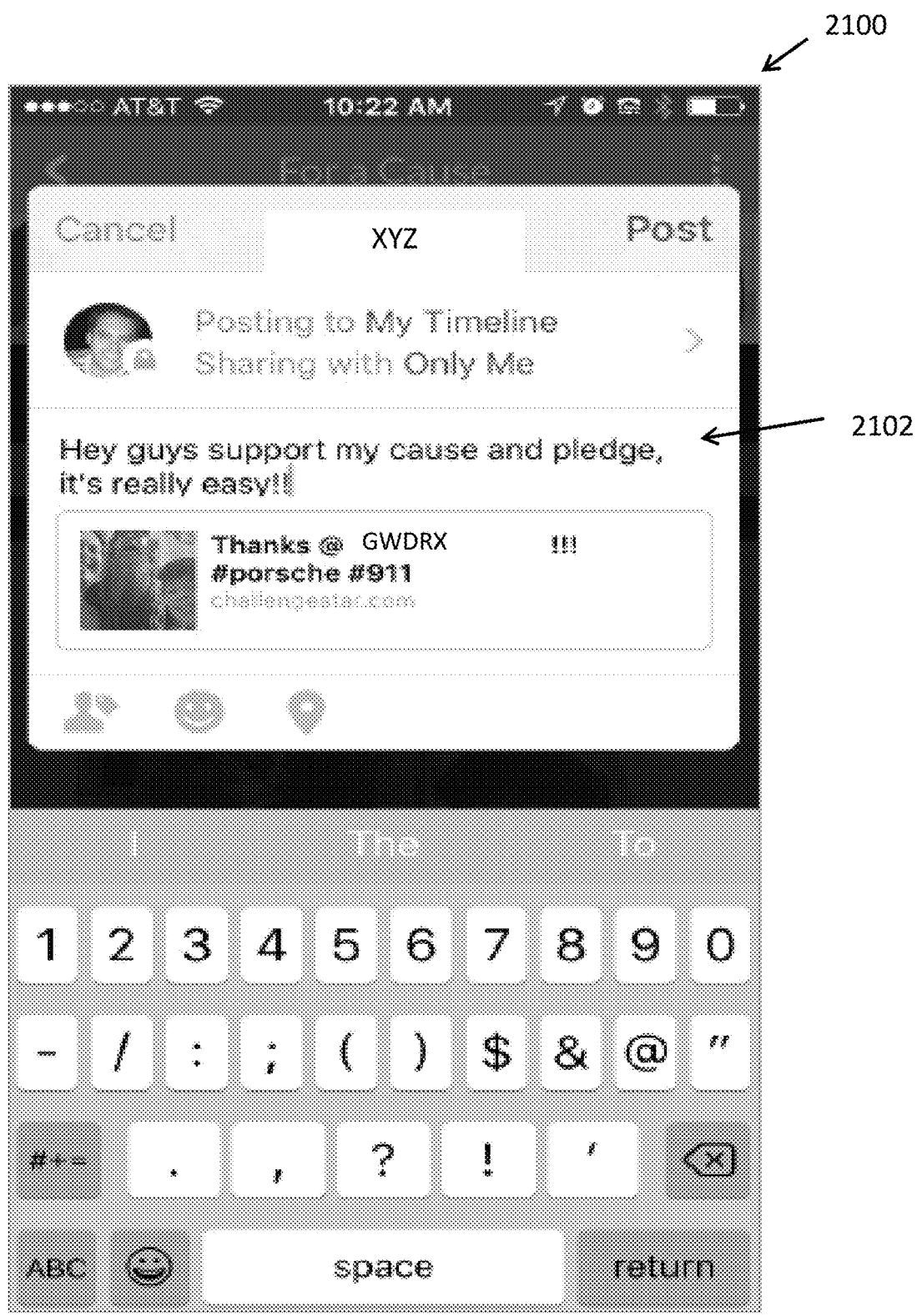
Figure 22:
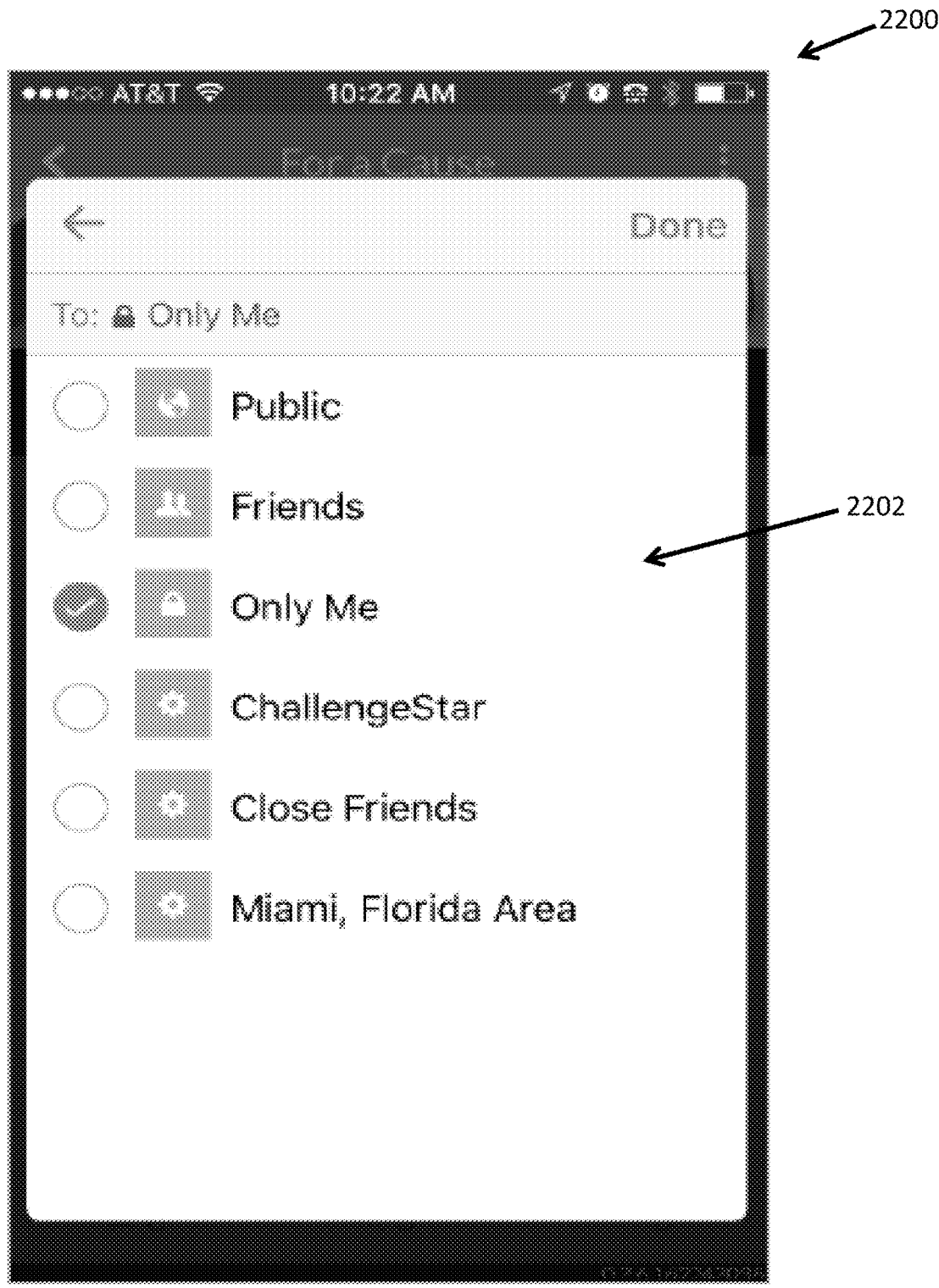

In embodiments, upon determining what electronic information is to be sent and where the electronic information is to be sent, a user may electronically select to be returned back to screen shot 1800 or may be sent to screen shot 2100 as shown in FIG. 21. As shown, screen shot 2100 may include portion 2102. In embodiments, portion 2102 may include the name of the web-based application ("XYZ"), and information about with which other users will receive the electronic communications post. Also, as shown in portion 2102, the user may include an additional message that was not electronically included in the electronic communications post shown in FIG. 18. In embodiments, the message may include text, symbols, images, etc. In embodiments, the selection of the "post" feature within portion 2102 may result in one or more of the information electronically displayed in screen shot 1800 to be electronically sent to a webpage. In embodiments, the selection to post portion 2102 may result in screen shot 2200, as shown in FIG. 22, to be displayed on the user's client device 144. In embodiments, the user can select the levels of privacy associated with the posting of portion 2102. In embodiments, the selections, shown in FIG. 22 may be selected within additional options provided in the selection page described in FIG. 20.

In embodiments, screen shot 2200 may be considered as a draft of what will be eventually posted and allows a user to preview how the electronic post will appear on another computer-based application or webpage, which is different than electronic communications platform 146. In alternate embodiments, the selection of portion 2102 may result in the sharing of the electronic post with another web-based application as described in FIG. 23, or may result in electronically displaying screen shot 2400, described in FIG. 24 without a requirement to display screen shot 2300.

Figure 23:

FIG. 23 shows example screen shot 2300. In embodiments, screen shot 2300 includes portion 2302. As shown in FIG. 23, portion 2302 may include some or all of the electronic information displayed in screen shot 1800. In embodiments, screen shot 2300 may be displayed on a web-based application that interacts with electronic communications platform 146. In embodiment, the web-based application as shown in FIG. 23 may electronically receive information about an electronic communications post (e.g. screen shot 2300) based on one or more electronic selections from a selection page that may be associated with share icon 1808 or icon 1810.

Figure 24:
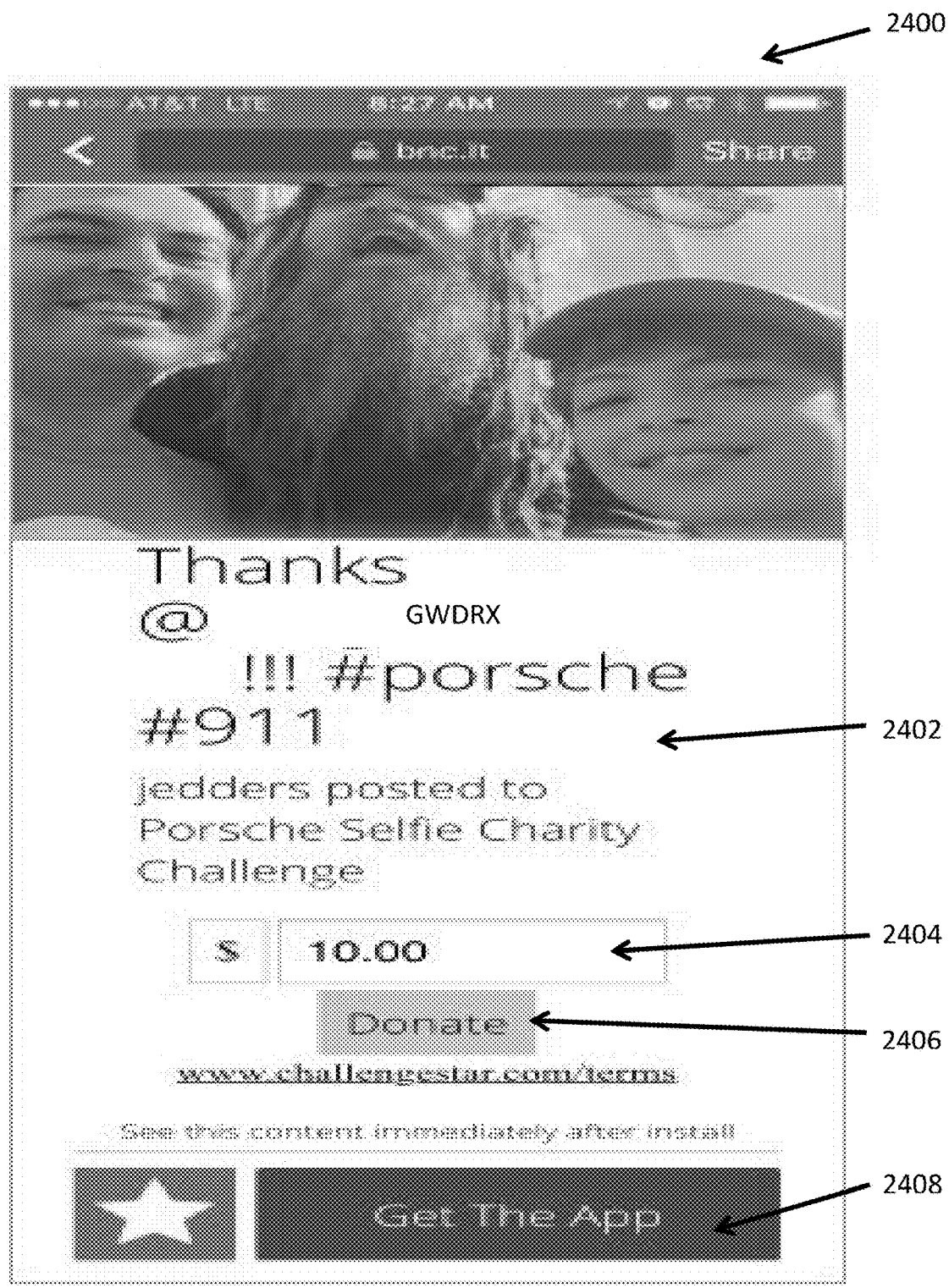

In embodiments, upon touching any part of portion 2302, such as the image, the text, etc., screen shot 2400, as shown in FIG. 24, may be electronically displayed on client device 144. As shown in FIG. 24, screen shot 2400 may include portion 2402, value area 2404, icon 2406, and icon 2408. In embodiments, screen shot 2400 may be displayed within the same web-based application that displays screen shot 2300. In alternate embodiments, electronically selecting screen shot 2300 may initiate an electronic communication that displays a screen shot 2400 that is associated with electronic communications platform 146 or is associated with another web-based application. In this alternate embodiment, the selection of screen shot 2300 may automatically initiate communication with a URL associated with another web-based application or electronic communications platform 146.

In embodiments, portion 2402 may include information about an electronic communications post, such as screen shot 1800. For example, as shown in portion 2402, the displayed electronic information includes the name of electronic communications platform 146 ("Challenge Star"), the title of the event ("Thanks@GWDRX!!!#porsche#911"), identifying information about the user who posted the information ("Jedders posted to Porsche Selfie Charity Challenge"), and an area to enter a numerical value in value area 2404.

In embodiments, icon 2406, when selected by a user (e.g., by a pressing action, sliding action, etc.) allows for the amount (e.g., an amount of electronic tokens) entered in value area 2404 to be electronically sent to another computer-based application which then electronically transfers (i.e. electronically communicates) a value (associated with electronic tokens pledged to an electronic communications event and/or an electronic communications post) from one database to another database associated with electronic communications platform 146. In embodiments, the amount of electronic tokens can be associated with an electronic communications event as described in FIGS. 1-17. In embodiments, icon 2406 appears in the computer-based application (e.g., mobile application and associated web pages, servers, etc.) based on electronic communications, including particular electronic information, that are sent from electronic communications platform 146 via one or more of the devices described in FIG. 1 and based on configurations that are determined in FIGS. 18-21. In embodiments, the particular electronic information includes information that creates an electronic relationship between the user identifier associated with an electronic communications platform 146 and another user identifier associated with the computer-based application displaying screen shot 2400 which allows associating electronic tokens (e.g., for a pledge or a sweeten value) to an electronic communications event and/or electronic communications post as described in FIGS. 1-17.

In embodiments, the particular electronic information may include information that allows for electronic communications between electronic communications platform 146 to be sent to any type of computer-based application. Accordingly, the particular electronic information includes generating icon 2406, or other displayable electronic information, for display in the computer-based application and allowing electronic transactions of electronic tokens to occur within any kind of computer-based application (e.g., web-based application, SMS application, etc.) based on selection of icon 2406. For example, electronic communications platform 146 may determine that icon 2406 is associated with a mobile application. Thus, electronic communications platform 146 may send the particular electronic information associated with icon 2406 via a server for that mobile application account to generate icon 2406 for display and use within the mobile application. In embodiments, this relationship results in various electronic transactions of various types of electronic tokens initiated by the computer-based application to change electronic information that is stored for and/or by one or more computing devices (e.g., servers) associated with electronic communications platform 146. In embodiments, this relationship also updates ranking values in electronic communications platform 146 based on electronic communications and/or transactions initiated by the computer-based application.

Figure 25:
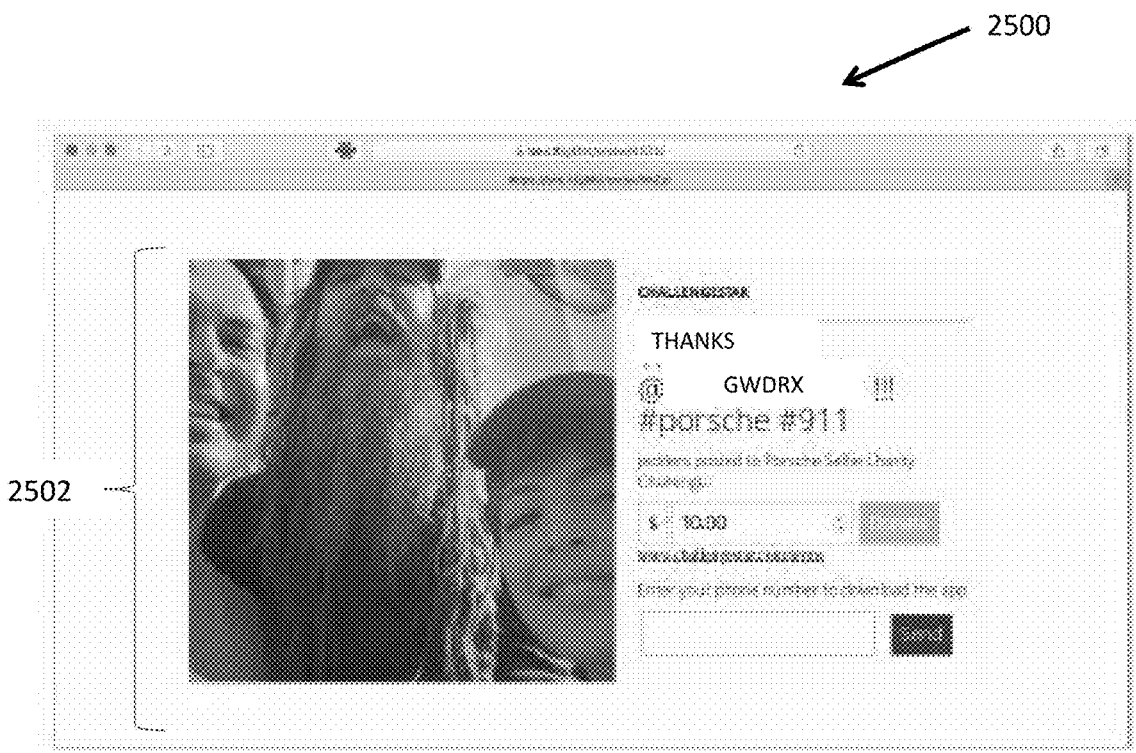

While FIGS. 24 and 25 describes an icon button for icon 2406, icon 2406 may be displayed as a hyperlink that allows for a user of the computer-based application to electronically transfer electronic tokens in the manner described in FIGS. 24-25. As such, selecting the hyperlink may electronically display a screen shot of electronic communications platform 146 or a screen shot of another computer-based application that initiates transferring electronic tokens that changes electronic information relating to an electronic communications event and/or an electronic communications post in a manner similar to that described in FIGS. 24 and 25.

In alternate embodiments, icon 2406 may appear in the computer-based application based on electronically generating a plug-in that is incorporated into a web browser and creates a relationship between electronic communications platform 146 and a computer-based application that displays icon 2406 for generating electronic transactions as discussed in FIG. 24 or 25. The plug-in may be downloaded based on an electronic message sent from electronic communications platform 146 to the computer-based application or the plug-in may be downloaded by retrieving the plug-in from a web page.

In embodiments, the selection of icon 2406 may bring up another display screen that provides options to the user on who to electronically transfer the amount entered in value area 2404. In embodiments, the user may be given the option to select a pre-selected website or given the option to enter a URL, or a name, associated with the URL, that will provide the user with ability to interact with another computer-based application (e.g., a web-based application, another type of computer application, and any related computer servers and/or computer databases, etc.) or electronic communications platform 146 to perform the electronic transfer action. In embodiments, the other display screen (e.g., an electronic page) may allow the user to enter identifier information (e.g., account number) about a particular electronic account that has electronic tokens which results in an electronic communication with that particular electronic account stored by a sever or computing device. In embodiments, the other display screen may automatically include information about the user who posted the electronic communications post, shown in FIG. 18, and also information about the user of computer-based application who wants to electronically transfer electronic tokens. In embodiments, the user may also enter information about another computer-based application (e.g., a website, any related computer database or servers of the other computer-based application, etc.) that can electronically transfer electronic tokens from that other computer-based application's database or servers to electronic communications platform 146. In embodiments, once information is entered on the other display screen and the user initiates the transaction (e.g., by selecting a confirmation or transaction selection icon), this may result in electronic tokens and/or their value being electronically transferred to a database associated with electronic communications platform 146's electronic communication event; and, thus, increasing a value of electronic tokens in the database associated with electronic communications platform 146 and a particular electronic communications event.

In alternate embodiments, the selection of icon 2406 and/or entering a value in value area 2404 may result in electronic tokens being automatically transferred (either from a database associated with the computer-based application, or from another database associated with the other computer-based application) to a computer database associated with electronic communications platform 146 without the user being sent to another electronic page to enter any additional information to initiate the transfer of electronic tokens. For example, the user of the computer-based application may have stored electronic information (e.g., by electronic communications platform 146 or the computer-based application) based on previous electronic communications that allows for the automatic electronic transfer of electronic tokens to electronic communications platform 146. For example, the user of the computer-based application may be registered with electronic communications platform 146. Thus, the user may receive an electronic receipt as, described, upon selecting icon 2406 and a resulting electronic transfer of the electronic tokens. Accordingly, when an amount of electronic tokens is determined and/or icon 2406 is electronically selected, the computer-based application may either (i) electronically communicate with another computer based application which then updates a value of electronic tokens within a database associated with electronic communications platform 146, or (ii) electronically communicates with its own database and updates a database associated, via electronic communications, with electronic communications platform 146 with a new value of electronic tokens.

While FIG. 24 describes a value area 2404 and icon 2406, in alternate embodiments, icon 2406 may include and display a predetermined value, associated with a particular number of electronic tokens, which is generated by electronic communications platform 146 for display in an electronic page in the computer-based application. Thus, a user of the computer-based application does not need to enter any value, but only has to select icon 2406 and that amount of electronic tokens will become associated with a particular electronic communications event. For example, icon 2406 may indicate "Donate 5" and by selecting icon 2406, five electronic tokens are transferred from one electronic database to another electronic database associated with an electronic communications event or electronic communications post. Furthermore, there may be more than one icon 2406 with each icon 2406 having different values that can be used by a user of a computer-based application to electronically interact with an electronic communications event occurring on electronic communications platform 146.

In alternate embodiments of screen shot 2400, value area 2404 may be displayed along with icon 2406 having a proposed value amount; and, thus, providing a user of the computer-based application with multiple ways to communicate with electronic communications platform 146. In other embodiments, value area 2404 may not be displayed and a user of the computer-based application can only transfer electronic tokens by selecting an amount proposed and displayed within one or more icons 2406. In further embodiments, icon 2406 may be displayed over the image as shown in FIG. 24. In additional embodiments, there may be no icon 2406 and selection of the image, shown in FIG. 24, changes screen shot 2400 to another screen shot with options to transfer electronic tokens, as described in one or more of the other embodiments.

Thus, when icon 2406 is selected, an electronic page may display the amount of electronic tokens to be pledged along with the name of the electronic communications post and/or electronic communications event. For example, the electronic page may include information such as, for example, "Receipt for 10 tokens—Porsche 911 Challenge." Thus, the number of electronic tokens being transferred is shown and information about the electronic communications event ("Porsche 911 Challenge") is also shown.

In embodiments, based on the selection of icon 2406, the amount of electronic tokens are transferred and an electronic communications message is automatically sent back from the computer-based application to electronic communications platform 146. In embodiments, an electronic confirmation from the other computer-based application may trigger the computer-based application, in communication with electronic communications platform 146, to send an electronic message to electronic communications platform 146 that electronic tokens have been transferred from one electronic database to another electronic database.

In alternate embodiments, the selection of icon 2406 may result in the above described communications to occur only between the computer-based application and electronic communications platform 146. Thus, electronic tokens are transferred from a database associated with the computer-based application (thus, resulting in a lower value of electronic tokens in that database) to another database associated with electronic communications platform 146 (thus, increasing the value of electronic tokens in the other database).

In embodiments, electronic communications platform 146 may then include information in the electronic communications post, as shown in FIG. 18, with an updated value of the number of electronic tokens associated with the electronic communications post and/or the electronic communications event. For example, if 10 electronic tokens are electronically transferred from an electronic database, based on selecting icon 2406 on a webpage, website, etc., then electronic communications post (e.g., FIG. 18) may have an updated value that has increased by 10 electronic tokens. Accordingly, electronic interactions between one computer application and the other computer application results in an automatic update information in electronic communications platform 146. Thus, electronic computing resources (e.g., memory, power, etc.) are reduced by reducing the number of interactions needed to update information in electronic communications platform 146.

In embodiments, another electronic communications message may be automatically sent from electronic communications platform 146 to the other computer-based application which may provide electronic information that confirms the electronic transfer of the electronic tokens. Furthermore, another electronic confirmation message (which may be displayed by the computer-based application to a user) may be sent from electronic communications platform 146 to the computer-based application that was used to initiate the electronic transfer of electronic tokens as described in FIG. 24.

In alternate embodiments, the other computer-based application, as described above, may not be in direct electronic communication with electronic communications platform 146. Instead, the other computer-based application is in communication with the computer-based application (e.g., a website), which is in electronic communication with electronic communications platform 146. Thus, all electronic communications between the other computer-based application and the electronic communications platform 146 occur via the computer-based application as described in FIG. 24.

In alternate embodiments, the selection of icon 2406 may be associated with providing electronic tokens to the electronic communications event rather than a particular electronic communications post. For example, the selection of icon 2406 may further provide an option to make the amount to be a sweeten amount, which has been described in FIGS. 1-10. Accordingly, the electronic communications post may not update its own value of the number of electronic tokens if the selection of icon 2406 was to provide a sweeten amount.

In embodiments, icon 2408 may, when selected by the user, electronically display information similar to screen shot 1100, as described in FIG. 11. In embodiments, icon 2406 and icon 2408 may be combined and allows a user to electronically register with electronic communications platform 146 as well as make an electronic transfer of electronic tokens associated with value area 2404. In embodiments, portion 2402 may include an icon that, when selected by a user, electronically displays additional information about the electronic post. For example, this may include information about the user posting the electronic communications post, the electronic communications event, the amount of electronic tokens associated with the electronic communications post, etc.

In embodiments, the selection of icon 2406 and the electronic transfer of electronic tokens may result in an electronic message (e.g., "John gave 5 tokens to XYZ Challenge") displayed by the computer-based application that is viewable (e.g., via electronic pages that are electronically displayed within the computer-based application) to other users of the computer-based application that the user has electronically transferred a value of electronic tokens to a particular electronic communications event and/or electronic communications post associated with electronic communications platform 146. In embodiments, based on electronic communications sent from the computer-based application (or another computer-based application) to the electronic communications platform 146, the electronic message (about the electronic tokens transfer) may also be simultaneously displayed to other users of electronic communications platform 146 within the particular electronic communications event and/or electronic communications post. As such, one or more other users, who have permission, of communications platform 146 can also view the electronic message on one or more client devices 144. In embodiments, the electronic transfer of electronic tokens initiated in the computer-based application may result in an updated ranking value of an electronic communications post in electronic communications platform 146.

In alternate embodiments, icon 2406 and/or an electronic area (e.g., for entering numbers, images, or alphabetical letters) may be used by a user of the computer-based application to vote, comment, and/or like electronic communication posts associated with electronic communications platform 146. Thus, selection of icon 2406 and/or sending the electronic information by the computer-based application may result in an increase in the number of likes as electronically displayed by electronic communications platform 146. Furthermore, electronic information about the vote, like, and/or comment by the user of the computer-based application is also displayed by the computer-based application (e.g., "Tom liked XYZ Challenge," "Jane said 'Good luck with the XYZ Challenge'," etc.) and permits other users of the computer-based application to view such electronic information on their electronic pages within the computer-based application. In embodiments, based on electronic communications sent from the computer-based application (or another computer-based application) to the electronic communications platform 146, the electronic message (about the vote, like, and/or comment) may also be simultaneously displayed by electronic communications platform 146 within the particular electronic communications event and/or electronic communications post. As such, one or more other users, who have permission, of communications platform 146 can also view the electronic message on one or more client devices 144. In embodiments, the voting or liking action performed by a user within the computer-based application may result in an updated ranking value of an electronic communications post in electronic communications platform 146. In embodiments, the initial voting, donating, or any other action by the user, if occurring on a mobile device or cellular device, may result in the user's phone number or other identifier (e.g., mobile device number (MDN)) being stored by electronic communications platform 146, or a device associated with electronic communications platform 146. As such any future voting, donating, or other interactions, with electronic communications platform 146, by that user is recognized by the stored information of the user (e.g., the phone number). Thus, for future electronic communications events, the user may be pre-registered with electronic communications platform 146 to vote or donate electronic tokens to a particular electronic communications event associated with electronic communications platform 146 based on the stored phone number of other mobile device identifier. Therefore, the user may be able to interact with electronic communications platform 146 based on the past electronic interaction that occurred via the mobile device or cellular device. Thus, various network devices and communications platform 146 may use fewer computing resources (e.g., memory for storing registration information) while allowing for increased electronic communications with electronic communications platform 146.

In other embodiments, icon 2406 may be used by a user of the computer-based application for both voting, commenting, liking, and initiating the electronic transfer of electronic tokens for electronic communication posts associated electronic communications platform 146. Furthermore, electronic information about the vote and the electronic transfer of the electronic tokens by the user of the computer-based application is also displayed within the computer-based application and permits other users of the computer-based application to view such electronic information on their electronic pages within the computer-based application. In embodiments, based on electronic communications sent from the computer-based application (or another computer-based application) to the electronic communications platform 146, the electronic message (about the vote, comment, and the electronic token transfer) may also be simultaneously displayed by electronic communications platform 146 within the particular electronic communications event and/or electronic communications post. As such, one or more other users, who have permission, of communications platform 146 can view the electronic message on one or more client devices 144. In embodiments, the voting action, the liking action, and/or the electronic transfer of electronic tokens performed by a user within the computer-based application may result in an updated ranking value of an electronic communications post in electronic communications platform 146.

In alternate embodiments, screen shot 2400 may include an electronic area within portion 2402 that allows for the input of information relating to a phone number, email, or other communications identifier that allows for information to be sent that communications identifier about electronic communications platform 146.

In alternate embodiments, information in the electronic communications post, shown in FIG. 18, may be shared with a user using a cellular device, such as a cellphone. Thus, for example, the user of the cellphone may receive a message based on the sharing of the electronic communications post described in FIGS. 18-25. In embodiments, the cellphone display may include electronic information, sent from electronic communications platform 146 to the cellphone, which provides a user of the cellphone to electronically transfer electronic tokens. Furthermore, the electronic information generates a text message that is displayed on the cellphone. Thus, the user of the cellphone may receive the text message that provides information about the electronic communications post and requests initiating an electronic communication, such as initiate an electronic communication to electronically transfer electronic tokens. Furthermore, the text message may include a verification code. The user of the cellphone may then agree to make the electronic transaction of electronic tokens by entering a value from the keypad (e.g., press '1' or enter the verification code itself to affirm making the electronic transaction). As such, the amount of electronic tokens may be added to an electronic database of values associated with the cellular device.

In embodiments, the electronic communications between a computer-based application and a cellular device may include electronic interactions between a cellular network and a non-cellular network (e.g., a packet-based network). In embodiments, the interaction between the computer-based application, in a network described in FIG. 1, and the cellular device, in a cellular network, may cause an electronic transaction that changes a value in a database associated with the cellular device, the computer-based application, another computer-based application, updates electronic information (e.g., pledged amount, sweeten amount, ranking) in a server or computing device associated with electronic communications platform 146, and/or electronically displays the updated electronic information (e.g., the updated value of electronic tokens, a message indicating donation of the electronic tokens—"Tom donated 5 tokens to XYZ Challenge, etc.) on electronic communications platform 146 for other users to view; and, may simultaneously display the same electronic message on a computer-based application, associated with the user, for other users of the computer-based application to view. In embodiments, the user of the cellular device may use the cellular device to be able to vote, comment or like a particular electronic communications post; and, as such, an electronic message, about the vote, comment, or like, may be simultaneously displayed on an electronic page displayed by electronic communications platform 146 and/or a computer-based application, associated with the user, so that other users of the computer-based application and other users of electronic communications platform 146 can view the electronic message via client device 144. In embodiments, a like or vote initiated by a user on the cellular device may change a numerical ranking of an electronic communications post in electronic communications platform 146.

In embodiments, the electronic communication of the electronic communication post, generated by electronic communications platform 146, described in FIG. 18 with other web-based applications which are not the electronic communications platform 146 may require an interaction between multiple devices described in FIG. 1. For example, an electronic communication between client device 144 and ORM 122, API 124 and 125, and website content via one or more networks, may allow information to be sent from electronic communications platform 146 to another computer-based application or a cellular phone. Furthermore, any electronic transactions initiated on another computer-based application may result in information to be sent to electronic communications platform 146. In embodiments, electronic communications platform 146, a computer-based application, and another computer-based application may have different geographical locations.

FIG. 25 describes a screen shot 2500 with a portion 2502. FIG. 25 describes a shared electronic communication post within a client device 144 that is a desktop. In embodiments, the features of portion 2502 are similar to features shown in FIG. 24, except FIG. 25 provides an additional option for a user to enter a phone number to receive a message on their mobile phone to download electronic communications platform 146 on their mobile phone. Thus, for example, the desktop sends an electronic message to a network device associated with electronic communications platform 146; and, the network device, based on the phone number, sends electronic communications platform 146 to the mobile device associated with the phone number. In embodiments, the donation of electronic tokens or things of value is similar to that described in FIG. 24.

Figure 26:
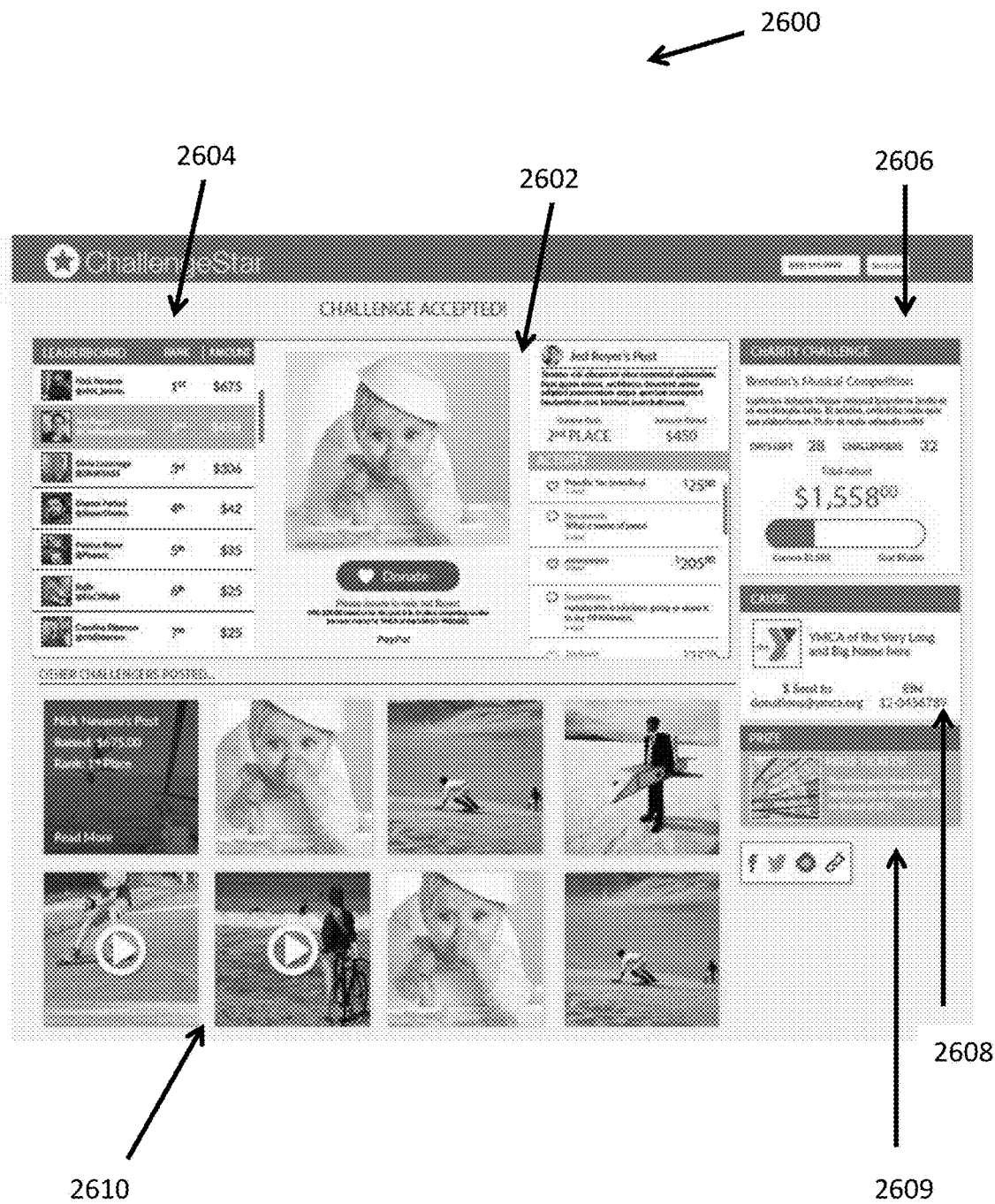

FIG. 26 describes screen shot 2600 with portions 2602, 2604, 2606, 2608, 2609, 2610, and 2612. FIG. 26 describes a shared electronic communication post within a client device 144 that is a desktop, laptop, television screen, or any other type of multimedia device. In embodiments, the features of portion 2602 are similar to features shown in FIG. 24, such that a user can donate funds or provide votes for a particular electronic communications event. In embodiments, by selecting the donate button, the user may automatically transfer electronic tokens to a particular electronic communications event, or an electronic form is displayed to allow the user to enter information to initiate the transfer of electronic tokens. In embodiments, the donation button may be associated with a particular amount of electronic tokens. By selecting the donation button, which may be similar to icon button 2406 as described in FIG. 24, electronic tokens are automatically transferred from one electronic location to a computing device associated with electronic communications platform 146. Furthermore, the ranking of different users, shown in portion 2604 and 2606, may simultaneously and automatically change based on the amount of electronic tokens transferred. Furthermore, the amount of electronic tokens shown in portion 2604 (the graphic titled "Total Raised") can also change simultaneously with a selection of the donation button in portion 2602. In embodiments, portion 2608 describes a particular group (e.g., a particular charity or competition) that is associated with the electronic communications event. In embodiments, portion 2609 describes an optional electronic interaction that rewards a user (e.g., a prize electronically transferable to the user, a non-electronic prize, etc.) that earns the most electronic tokens within an electronic communications event. In embodiments, portion 2610 describes posts, photos, videos, and other types of information that have been associated to the electronic communications event by other users associated with the electronic communications event.

Thus, FIGS. 18-26 describe interactive electronic communications that reduce the number of electronic resources of multiple computing devices (e.g., client device 144, servers described in FIG. 1, etc.) by performing the interactive electronic communications simultaneously and/or in real time. Furthermore, FIGS. 18-26 describe example computer processes that increase the amount of electronic tokens being transferred between different computing locations without a proportional increase in the number of electronic transactions while increasing the number of electronic communications that include text messages, images, and/or symbols.

Accordingly, systems, devices, and/or described herein may allow for a user, of an electronic communications platform, to set up an electronic communications event and allow multiple other users to create their own electronic communications posts which are then aggregated together into the electronic communications event. The foregoing description of implementations provides illustration and description, but is not intended to be exhaustive or to limit the implementations to the precise form disclosed.

Modifications and variations are possible in light of the above disclosure or may be acquired from practice of the implementations.

While series of blocks have been described with regard to FIGS. 5-10, the order of the blocks may be modified in other implementations. Further, non-dependent blocks may be performed in parallel.

While various actions are described as selecting, displaying, transferring, sending, receiving, generating, notifying, and storing, it will be understood that these example actions are occurring within an electronic computing and/or electronic networking environment and may require one or more computing devices, as described in FIG. 1, to complete such actions. Furthermore, it will be understood that these various actions can be performed by using a touch screen on a computing device (e.g., touching an icon, swiping a bar or icon), using a keyboard, a mouse, or any other process for electronically selecting an option displayed on a display screen to electronically communicate with other computing devices as described in FIG. 1. Also it will be understood that any of the various actions can result in any type of electronic information to be displayed in real-time and/or simultaneously on multiple client devices 144. It should also be understood that the electronic transfer of electronic tokens may result in (i) the change of a value stored in a computing device, server and/or database based on one or more electronic communications, and/or (ii) the change in the amount of memory storage of electronic bits in a computing device, server and/or database based on one or more electronic communications.

In embodiments, only electronic communications platform 146 may allow for the creation of electronic communications events and/or electronic communications posts. In embodiments, other applications (e.g., computer-based applications, other computer-based applications, and/or other websites), which are not electronic communications platform 146, can interact with electronic communications platform 146 (e.g., communicating voting and/or the electronic transfer of electronic tokens) but may not be used to create electronic communications events and/or electronic communication posts.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electronic communications method, comprising:
receiving, by an electronic communications platform, a request to create an electronic communications event, wherein the electronic communications platform is electronically operating within a client device;
requesting, by the electronic communications platform, content associated with the electronic communications event;
receiving, by the electronic communications platform, the content, wherein the content includes a photo, a title, text, and a time limit for interacting with the electronic communications event;
electronically generating and posting, by the electronic communications platform, an electronic communications post associated with the electronic communications event, based on the received content and geolocation information; and
sending, by the electronic communications platform, an electronic message to a computer-based application on another client device,
the message generating an electronic icon displayed on the other client device.

2. The electronic communications method of claim 1, wherein the electronic communications event includes multiple electronic communications posts, and another electronic communications event, associated with the electronic communications event, is stored by a computing device, and electronic communications by the computing device electronically notify a user of the other electronic communications event.

3. The electronic communications method of claim 2, wherein the electronic notification of the other electronic communications event reduces computer processing requirements of the client device.

4. The electronic communications method of claim 1, wherein:
the electronic icon is selected by a user of the other client device, and
the selection of the electronic icon results in electronically updating a database associated with the electronic communications event and also updating another database associated with another computer-based application.

5. The electronic communications method of claim 4, wherein the updating the database associated with the electronic communications event also generates updated electronic information displayed on the client device.

6. The electronic communications method of claim 5, wherein the updating the database associated with the electronic communications event reduces computing storage resources associated with the other database.

7. The electronic communications method of claim 1, wherein the content is not stored by the client device and reduces the amount of computer electronic memory used by the client device.

8. A computer-readable medium, comprising:
a plurality of instructions that, when executed by one or more processors of a client device, in association with an electronic communications platform, causes the one or more processors to:
receive a request to create an electronic communications event;
request content associated with the electronic communications event;
receive the content, wherein the content includes a photo, a title, text, and a time limit for interacting with the electronic communications event;
generate and post, electronically, an electronic communications post associated with the electronic communications event,
the electronic communications post is based on geolocation information from another computing device;
send a generated electronic message to a computer-based application,
the generated electronic message including electronic information to generate an electronic icon that is electronically displayed on another client device associated with the computer-based application;
receive an electronic message, from the client device; and
update a database associated with the electronic communications event.

9. The computer-readable medium of claim 8, further comprising:
a plurality of instructions that, when executed by one or more processors of the client device, in association with the electronic communications platform, causes the one or more processors to:
reduce the number of electronic communications signals sent between the client device and other devices based on the client device receiving automatic electronic notifications that does not required the client device from making its own electronic communications queries through a network.

10. The computer-readable medium of claim 8, further comprising:
a plurality of instructions that, when executed by one or more processors of the client device, in association with the electronic communications platform, causes the one or more processors to:
determine that the electronic communications event is expired; and
calculate a value associated with the electronic communications event after the expiration.

11. A device, comprising:
a processor, coupled to memory, to:
receive a request to create an electronic communications event;
request content associated with the electronic communications event;
receive the content, wherein the content includes a photo, a title, text, and a time limit for interacting with the electronic communications event; and
electronically generate and post an electronic communications post associated with the electronic communications event,
where the electronic communications event includes multiple electronic communications posts,
the multiple electronic communications posts is based on a computing device that includes:
a first computing device associated with an electronic activity feed, and
a second computing device associated with geolocation;
electronically generate and send an electronic message to another client device, the client device including another computer-based application which allows for the electronic message to be displayed on the other client device,
the electronic message including an icon.

12. The device of claim 11, further comprising:
receiving another electronic message from the other client device,
the other electronic message updating an electronic database associated with the electronic communications platform.

13. The electronic communications method of claim 1, where the electronic communications event includes multiple electronic communications posts, and
a ranking is determined and based on a quantity of the multiple electronic communications posts.

14. The electronic communications method of claim 13, where the ranking does not change based on additional electronic communications posts.

15. The computer-readable medium of claim 8, where the electronic communications event includes multiple electronic communications posts, and
a ranking is determined and based a total value of electronic tokens based on aggregating electronic token values from the multiple electronic communications posts.

16. The computer-readable medium of claim 15, where the ranking does not change based on additional electronic tokens.

17. The computer-readable medium of claim 16, where the electronic communications event includes multiple rankings.

18. The electronic communications method of claim 1, where the electronic icon is electronically selected and provides an option to electronically transfer electronic tokens.

19. The device of claim 11, where the geolocation determines one or more geographic locations associated with the content.

* * * * *